(12) United States Patent
Cote et al.

(10) Patent No.: US 8,471,932 B2
(45) Date of Patent: Jun. 25, 2013

(54) SPATIAL FILTERING FOR IMAGE SIGNAL PROCESSING

(75) Inventors: Guy Cote, San Jose, CA (US); Vaughn Todd Arnold, Scotts Valley, CA (US); Sumit Chawla, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 12/895,659

(22) Filed: Sep. 30, 2010

(65) Prior Publication Data
US 2012/0081553 A1    Apr. 5, 2012

(51) Int. Cl.
H04N 5/217 (2006.01)
H04N 9/64 (2006.01)
G06K 9/40 (2006.01)

(52) U.S. Cl.
USPC ............................. 348/241; 348/243; 382/260

(58) Field of Classification Search
USPC ....... 348/241, 222.1, 243, 248, 607; 382/260, 382/261, 262–264
See application file for complete search history.

(56) References Cited

U.S. PATENT DOCUMENTS

| | | | |
|---|---|---|---|
| 4,475,172 A | 10/1984 | Frederiksen |
| 4,589,089 A | 5/1986 | Frederiksen |
| 4,605,961 A | 8/1986 | Frederiksen |
| 4,682,360 A | 7/1987 | Frederiksen |
| 4,694,489 A | 9/1987 | Frederiksen |
| 4,742,543 A | 5/1988 | Frederiksen |
| 4,743,959 A | 5/1988 | Frederiksen |
| 4,799,677 A | 1/1989 | Frederiksen |
| 4,979,738 A | 12/1990 | Frederiksen |
| 5,227,863 A | 7/1993 | Bilbrey et al. |
| 5,247,355 A | 9/1993 | Frederiksen |
| 5,272,529 A | 12/1993 | Frederiksen |
| 5,496,106 A | 3/1996 | Anderson |
| 5,552,827 A | 9/1996 | Maenaka et al. |
| 5,640,613 A | 6/1997 | Yuyama et al. |

(Continued)

FOREIGN PATENT DOCUMENTS

| | | |
|---|---|---|
| JP | 20050269645 A | 3/2007 |
| JP | 4350706 B2 | 7/2009 |

(Continued)

OTHER PUBLICATIONS

PCT Search Report for related PCT Application No. PCT/US2010/052272 dated Jan. 11, 2010, 9 pages.

(Continued)

Primary Examiner — Nhan T Tran
(74) Attorney, Agent, or Firm — Fletcher Yoder PC

(57) ABSTRACT

Systems and methods are disclosed for applying spatial filtering to raw image data. For example, a spatial filter may identify an n x n block of pixels from an image frame. The spatial filter has filter taps, each corresponding to one of the pixels of the n x n block. Pixel difference values between the input pixel and each of the neighboring pixels in the n x n block may be determined. Attenuation factors may be determined based on the pixel differences and brightness of the input pixel. Applying the attenuation factors to their respective filtering taps may produce attenuated filtering coefficients that are used to obtain filtered pixel values. By normalizing the sum of the filtered pixel values using the sum of the attenuated filtering coefficients, a spatially filtered output value corresponding to the current input pixel (e.g., located at the center of the n x n block) may be determined.

29 Claims, 17 Drawing Sheets

U.S. PATENT DOCUMENTS

| | | | |
|---|---|---|---|
| 5,694,227 A | 12/1997 | Starkweather | |
| 5,764,291 A | 6/1998 | Fullam | |
| 5,790,705 A | 8/1998 | Anderson et al. | |
| 5,809,178 A | 9/1998 | Anderson et al. | |
| 5,822,465 A | 10/1998 | Normile et al. | |
| 5,867,214 A | 2/1999 | Anderson et al. | |
| 5,991,465 A | 11/1999 | Anderson et al. | |
| 6,011,585 A | 1/2000 | Anderson | |
| 6,028,611 A | 2/2000 | Anderson et al. | |
| 6,031,964 A | 2/2000 | Anderson | |
| 6,122,411 A | 9/2000 | Shen et al. | |
| 6,141,044 A | 10/2000 | Anderson et al. | |
| 6,157,394 A | 12/2000 | Anderson et al. | |
| 6,198,514 B1 | 3/2001 | Lee et al. | |
| 6,745,012 B1 | 6/2004 | Ton et al. | |
| 6,788,823 B2 * | 9/2004 | Allred et al. | 382/260 |
| 6,954,193 B1 | 10/2005 | Andrade et al. | |
| 6,959,044 B1 | 10/2005 | Jin et al. | |
| RE38,896 E | 11/2005 | Anderson | |
| RE38,911 E | 12/2005 | Anderson et al. | |
| RE39,213 E | 8/2006 | Anderson et al. | |
| 7,170,938 B1 | 1/2007 | Cote et al. | |
| 7,231,587 B2 | 6/2007 | Novotny et al. | |
| 7,277,595 B1 | 10/2007 | Reid | |
| 7,310,371 B2 | 12/2007 | Cote et al. | |
| 7,324,595 B2 | 1/2008 | Cote et al. | |
| 7,327,786 B2 | 2/2008 | Winger et al. | |
| 7,345,708 B2 | 3/2008 | Winger et al. | |
| 7,362,376 B2 | 4/2008 | Winger et al. | |
| 7,362,804 B2 | 4/2008 | Novotny et al. | |
| 7,454,057 B2 | 11/2008 | Tsukioka | |
| 7,502,505 B2 | 3/2009 | Malvar et al. | |
| 7,515,765 B1 | 4/2009 | MacDonald et al. | |
| 7,545,994 B2 | 6/2009 | Reid | |
| 7,596,280 B2 | 9/2009 | Bilbrey et al. | |
| 7,602,849 B2 | 10/2009 | Booth et al. | |
| 7,612,804 B1 | 11/2009 | Marcu et al. | |
| 7,620,103 B2 | 11/2009 | Cote et al. | |
| 7,932,935 B2 * | 4/2011 | Takei | 348/241 |
| 8,081,224 B2 * | 12/2011 | Lin | 348/241 |
| 2003/0214594 A1 | 11/2003 | Bezryadin | |
| 2004/0028265 A1 * | 2/2004 | Nishide | 382/261 |
| 2004/0218235 A1 * | 11/2004 | Kawano | 358/505 |
| 2004/0240549 A1 | 12/2004 | Cote et al. | |
| 2004/0240556 A1 | 12/2004 | Winger et al. | |
| 2005/0063465 A1 | 3/2005 | Cote et al. | |
| 2005/0088455 A1 * | 4/2005 | Chang | 345/603 |
| 2005/0105618 A1 | 5/2005 | Booth et al. | |
| 2005/0117040 A1 | 6/2005 | Matsutani | |
| 2005/0123282 A1 | 6/2005 | Novotny et al. | |
| 2005/0134602 A1 | 6/2005 | Winger et al. | |
| 2005/0134730 A1 | 6/2005 | Winger et al. | |
| 2005/0135699 A1 * | 6/2005 | Anderson | 382/261 |
| 2005/0216815 A1 | 9/2005 | Novotny et al. | |
| 2006/0012841 A1 | 1/2006 | Tsukioka | |
| 2006/0126724 A1 | 6/2006 | Cote et al. | |
| 2006/0227867 A1 | 10/2006 | Winger et al. | |
| 2007/0030898 A1 | 2/2007 | Cote | |
| 2007/0030902 A1 | 2/2007 | Winger et al. | |
| 2007/0030903 A1 | 2/2007 | Cote et al. | |
| 2007/0030904 A1 | 2/2007 | Winger et al. | |
| 2007/0030905 A1 | 2/2007 | Cote | |
| 2007/0030906 A1 | 2/2007 | Cote et al. | |
| 2007/0071343 A1 * | 3/2007 | Zipnick et al. | 382/254 |
| 2007/0126885 A1 | 6/2007 | Hasegawa | |
| 2007/0188634 A1 * | 8/2007 | Takei | 348/241 |
| 2007/0216785 A1 | 9/2007 | Nomura et al. | |
| 2007/0263724 A1 | 11/2007 | Cote et al. | |
| 2008/0088857 A1 | 4/2008 | Zimmer et al. | |
| 2008/0088858 A1 | 4/2008 | Marcu et al. | |
| 2008/0117330 A1 | 5/2008 | Winger et al. | |
| 2008/0122975 A1 | 5/2008 | Winger et al. | |
| 2008/0198932 A1 * | 8/2008 | Sei | 375/240.16 |
| 2008/0204600 A1 * | 8/2008 | Xu et al. | 348/607 |
| 2008/0205854 A1 * | 8/2008 | Xu et al. | 386/114 |
| 2008/0218630 A1 * | 9/2008 | Kempf et al. | 348/452 |
| 2008/0253652 A1 | 10/2008 | Gupta et al. | |
| 2009/0027525 A1 | 1/2009 | Lin et al. | |
| 2009/0052797 A1 | 2/2009 | Matsushita et al. | |
| 2009/0273679 A1 | 11/2009 | Gere et al. | |
| 2010/0061648 A1 * | 3/2010 | Wong et al. | 382/260 |
| 2010/0202262 A1 * | 8/2010 | Adams et al. | 382/260 |
| 2012/0081553 A1 | 4/2012 | Cote et al. | |

FOREIGN PATENT DOCUMENTS

| | | |
|---|---|---|
| KR | 1020080078076 A | 8/2008 |
| KR | 1020090010906 A | 1/2009 |
| KR | 1020090087811 A | 8/2009 |
| WO | 2006084266 A1 | 8/2006 |
| WO | 2007078912 A1 | 7/2007 |

OTHER PUBLICATIONS

U.S. Appl. No. 12/582,400, filed Oct. 20, 2009, Guy Cote et al.
U.S. Appl. No. 12/789,810, filed May 28, 2010, Guy Cote et al.
U.S. Appl. No. 12/789,815, filed May 28, 2010, Guy Cote et al.
U.S. Appl. No. 12/789,821, filed May 28, 2010, Guy Cote et al.
U.S. Appl. No. 12/846,008, filed Jul. 29, 2010, Guy Cote et al.
Takahashi, et al.; "Color Demosaicing Using Asymmetric Directional Interpolation and Hue Vector Smoothing," IEICE Transactions on Fundamentals of Electronics, Communications and Computer Sciences; Engineering Sciences Society, vol. E91A, No. 4, Apr. 1, 2008, pp. 978-986.
International Search Report for PCT Application No. PCT/US2010/052293, dated Mar. 15, 2011, 19 pgs.
Korean Search Report for Korean Patent Application No. 10-2012-7012990 dated Jun. 7, 2012; pp. 9.

* cited by examiner

SPATIAL FILTERING FOR IMAGE SIGNAL PROCESSING

BACKGROUND

The present disclosure relates generally to image signal processing and, more particularly, to techniques for applying spatial filtering to image data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, digital image capture devices have become increasing popular due, at least in part, to such devices becoming more and more affordable for the average consumer. Further, in addition to a number of stand-alone digital cameras currently available on the market, it is not uncommon for digital imaging devices to be provided integrally as part of another electronic device, such as a desktop or notebook computer, a cellular telephone, or a portable media player.

To acquire image data, most digital imaging devices include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline, which may apply a number of various image processing operations to the image data to generate a full color image that may be displayed for viewing on a display device, such as a computer monitor or a portable display on a handheld device.

While conventional image processing techniques generally aim to produce a viewable image that is both objectively and subjectively pleasing to a viewer, such conventional techniques may not adequately address errors and/or distortions in the image data introduced by the imaging device and/or the image sensor. Accordingly, various considerations should be addressed when processing a digital image obtained with a digital camera or other imaging device in order to improve the appearance of the resulting image, thereby reducing the overall user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to techniques for applying spatial filtering to image data using a spatial noise filter. In accordance with disclosed embodiments, a spatial filter may identify an n×n block of pixels from the current image frame, the n×n block including a plurality of neighboring pixels being centered about a current input pixel and being of the same color component as the current input pixel. The spatial filter may include a plurality of filter taps, with one filter tap corresponding to each of the pixels within the n×n block. A set of filtering coefficients for each filter tap, which may be based on a Gaussian function, may be determined. Further, a pixel difference value between the current input pixel and each of the plurality of neighboring pixels in the n×n block are determined, and the pixel differences may be used to determine an attenuation factor for each filter tap. In one embodiment, the attenuation factor is based upon the pixel difference value between the raw input pixel and the neighboring pixel at the filter tap and brightness of the current input pixel. An attenuated set of filtering coefficients may be obtained thereafter by applying the attenuation factors to their respective filtering taps. Subsequently, the attenuated filtering coefficients may be applied to obtain a set of filtered pixel values. By normalizing the sum of the filtered pixel values using the sum of the attenuated filtering coefficients, a spatially filtered output value corresponding to the current input pixel (e.g., located at the center of the n×n block) may be determined.

In one embodiment, the spatial noise filter may operate in either a bilateral mode or a non-local means mode. In the bilateral mode, pixel differences are calculated as the absolute value of the difference between the current input pixel and each neighbor pixel. In the non-local means mode, subsets of pixels (e.g., an m×m block, where m<n) centered about each of the current pixel and the neighbor pixel may be identified. The pixel difference may be determined by obtaining the sum of the absolute difference between the pixels of each m×m block, and normalizing the sum by the number of pixels in an m×m block. In further embodiments, the spatial noise filter may also operate as a three-dimensional spatial filter by providing a spatially filtered output for a current frame that is averaged with at least one previous frame.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
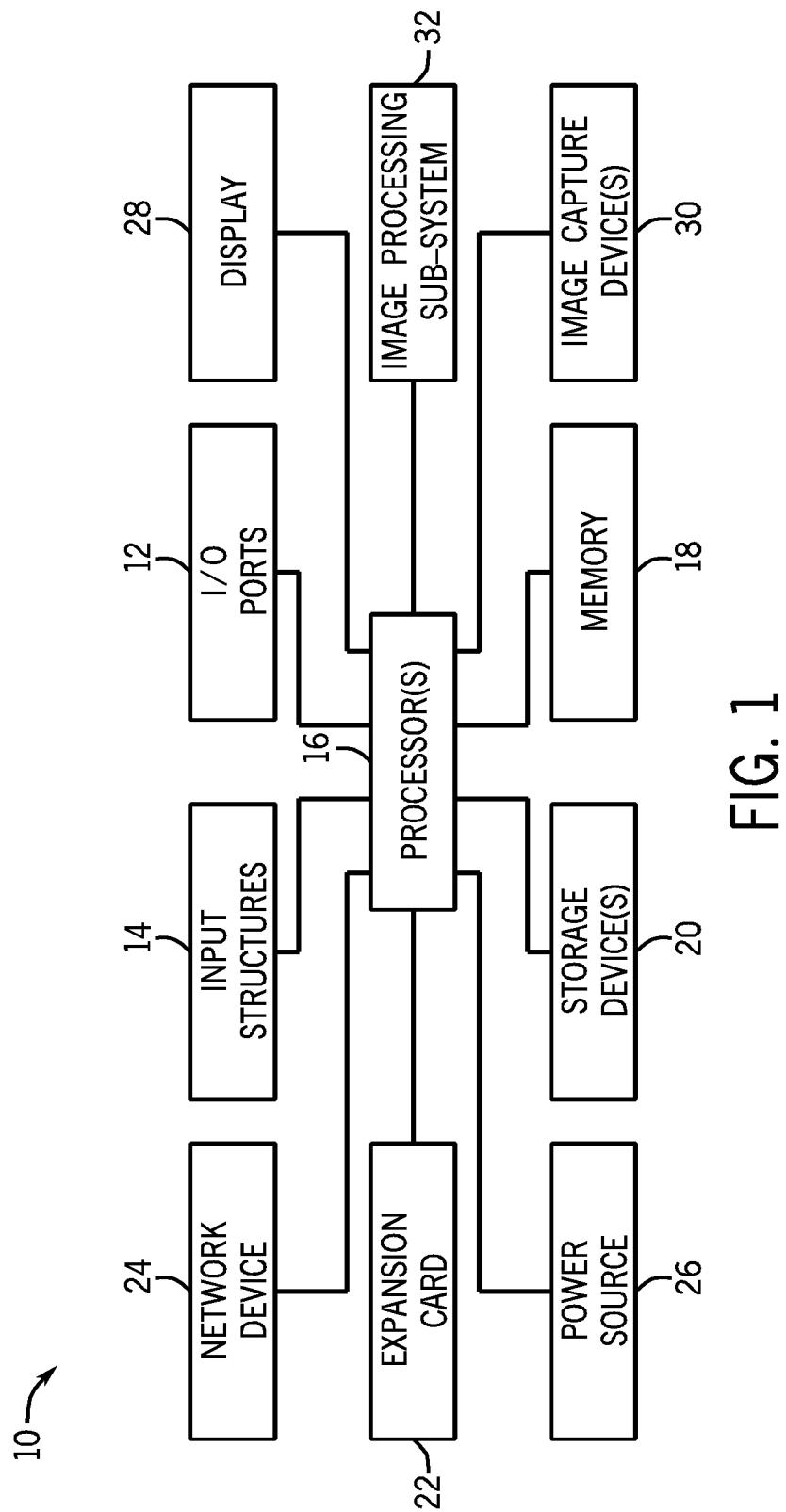
FIG. 1 is a block diagram depicting components of an embodiment of an electronic device that includes an image capture device and image processing circuitry configured to implement the image processing techniques set forth in the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to spatial filtering of raw image data using a spatial noise filter. In accordance with disclosed embodiments, a spatial filter may identify an n×n block of pixels from the current image frame, the n×n block including a plurality of neighboring pixels being centered about a current input pixel and being of the same color component as the current input pixel. The spatial filter may include a plurality of filter taps, with one filter tap corresponding to each of the pixels within the n×n block. A set of filtering coefficients for each filter tap, which may be based on a Gaussian function, may be determined. Further, a pixel difference value between the current input pixel and each of the plurality of neighboring pixels in the n×n block are determined, and the pixel differences may be used to determine an attenuation factor for each filter tap. In one embodiment, the attenuation factor is based upon the pixel difference value between the raw input pixel and the neighboring pixel at the filter tap and brightness of the current input pixel. An attenuated set of filtering coefficients may be obtained thereafter by applying the attenuation factors to their respective filtering taps. Subsequently, the attenuated filtering coefficients may be applied to obtain a set of filtered pixel values. By normalizing the sum of the filtered pixel values using the sum of the attenuated filtering coefficients, a spatially filtered output value corresponding to the current input pixel (e.g., located at the center of the n×n block) may be determined.

In certain embodiments, the spatial noise filter may operate in either a bilateral mode or a non-local means mode. In the bilateral mode, pixel differences are calculated as the absolute value of the difference between the current input pixel and each neighbor pixel. In the non-local means mode, subsets of pixels (e.g., an m×m block, where m<n) centered about each of the current pixel and the neighbor pixel may be identified. The pixel difference may be determined by obtaining the sum of the absolute difference between the pixels of each m×m block, and normalizing the sum by the number of pixels in an m×m block. In further embodiments, the spatial noise filter may also operate as a three-dimensional spatial filter by providing a spatially filtered output for a current frame that is averaged with at least one previous frame.

Figures 2, 3:
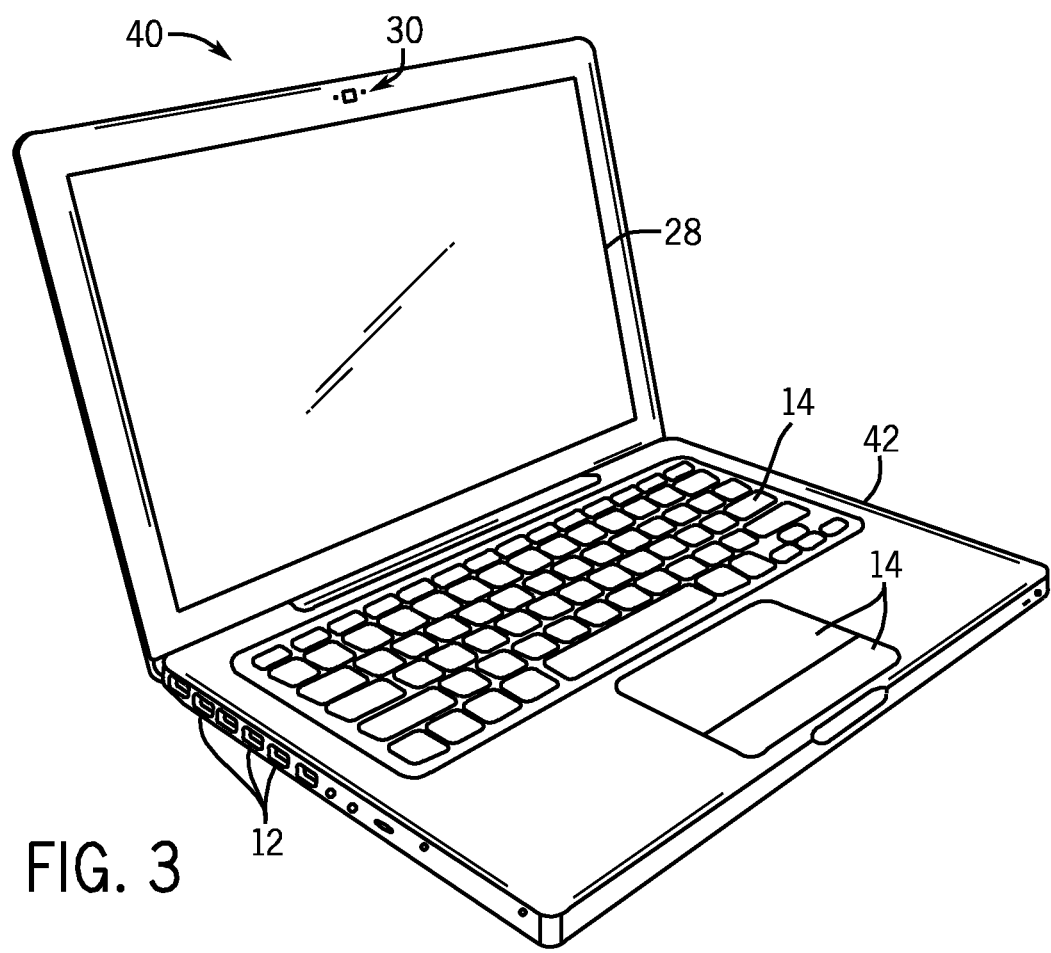
FIG. 2 is a graphical representation of a 2×2 pixel block of a Bayer color filter array that may be implemented in the image capture device of the electronic device of FIG. 1.
FIG. 3 is a perspective view of the electronic device of FIG. 1 in the form of a computer in accordance with aspects of the present disclosure

With the foregoing in mind, a general description of suitable electronic devices for performing the presently disclosed techniques is provided below. In particular, FIG. 1 is a block diagram depicting various components that may be present in an embodiment of an electronic device 10 suitable for use with the present techniques. FIG. 3 depicts an embodiment of the electronic device 10 in the form of a computer, and FIGS. 4 and 5 respectively depict front and back views of the electronic device 10 in the form of a handheld electronic device, wherein the illustrated computer and handheld device of FIGS. 3-5 include an image capture device and an image processing sub-system configured to apply to raw image data acquired by the image capture device various image processing operations, which may include, among other things, the spatial noise filtering techniques described herein.

As shown in FIG. 1, the electronic device 10 for performing the presently disclosed techniques may include, among other things, input/output (I/O) ports 12, input structures 14, one or more processors 16, memory device 18, non-volatile storage 20, expansion card(s) 22, networking device 24, power source 26, and display 28. Additionally, the electronic device 10 may include one or more image capture devices 30, such as a digital camera, and an image signal processing (ISP) sub-system 32. As will be discussed further below, the ISP sub-system 32 may be configured to implement and apply various image processing operations to image data acquired by the image capture device 30 in order to render a processed image that may be viewed by a user on the display 28 of the device 10. Additionally, image data processed by the ISP sub-system 32 may also include image data retrieved from the memory 18 and/or the non-volatile storage device(s) 20. Those of ordinary skill in the art will appreciate that the various functional blocks shown in FIG. 1 may include hardware elements (including circuitry), software elements (including computer code stored on a computer-readable medium) or a combination of both hardware and software elements. Further, FIG. 1 is only one example of a particular implementation and is merely intended to illustrate the types of components that may be present in the electronic device 10.

Before continuing, it should be understood that the system block diagram of the electronic device 10 shown in FIG. 1 is intended to be a high-level control diagram depicting various components that may be included in such a device 10. That is, the illustrated connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Thus, collectively, the processor(s) 16 may provide the processing capability to execute an operating system, programs, user and application interfaces, and to control and/or provide any other functions of the electronic device 10. The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more instruction set (e.g., RISC) processors, x86 processors, as well as graphics processors (GPU), video or image signal processors, audio processors and/or related chip sets. As will be appreciated, the processor(s) 16 may be coupled to one or more data buses for transferring data and instructions between various components of the device 10.

The display 28 may be used to display various images generated by device 10, such as images corresponding to a graphical user interface GUI for an operating system executed by one of the processor(s) 16, or image data (including still images and video data) processed by the ISP sub-system 32, as discussed further below. As mentioned above, the image data may include image data acquired using the image capture device 30 or image data retrieved from the memory 18 and/or non-volatile storage 20. The display 28 may be any suitable type of display, such as a liquid crystal display (LCD), plasma display, or an organic light emitting diode (OLED) display, for example. Additionally, in certain embodiments of the electronic device 10, the display 28 may be provided in conjunction with a touch-sensitive element, such as a touch-screen, that may serve as one of the input structures 14 and provide a control interface for the device 10. In one embodiment, the display 28 may be an LCD display device utilizing in-plane and/or fringe-field switching, and may be a model of a Retina® display, available from Apple Inc. of Cupertino, Calif.

The illustrated image capture device(s) 30 may include a digital camera configured to acquire both still images and moving images (e.g., video). The camera 30 may include a lens and one or more image sensors configured to capture and convert light into electrical signals. By way of example, the image sensor may include a CMOS image sensor (e.g., a CMOS active-pixel sensor (APS)) or a CCD (charge-coupled device) sensor. Generally, the image sensor in the camera 30 includes an integrated circuit having an array of pixels, wherein each pixel includes a photodetector for sensing light from an image scene. In some embodiments, the image sensor of the camera 30 may include on-board image signal processing logic that is separate from the ISP sub-system 32.

As will be appreciated, the photodetectors in the imaging pixels of the image sensor generally detect the intensity of light captured via the camera lens. However, photodetectors, by themselves, are generally unable to detect the wavelength of the captured light and, thus, are unable to determine color information. Accordingly, the image sensor may further include a color filter array (CFA) that may overlay or be disposed over the pixel array of the image sensor to capture color information. The color filter array may include an array of small color filters, each of which may overlap a respective pixel of the image sensor and be configured to filter the captured light by wavelength. Thus, when used in conjunction, the color filter array and the image sensor may provide both wavelength and intensity information with regard to light captured through the camera, which may be representative of a captured image.

In one embodiment, the color filter array may include a Bayer color filter array, which provides a color pattern that is 50% green elements, 25% red elements, and 25% blue elements. FIG. 2 shows a 2×2 pixel block of a Bayer CFA that includes 2 green elements (referred to Gr and Gb), 1 red element (R), and 1 blue element (B). Thus, an image sensor utilizing a Bayer color filter array may provide information regarding the intensity of the light received by the camera 30 at the green, red, and blue wavelengths, whereby each image pixel records only one of the three colors (red, green or blue). This information, which may be referred to as "raw image data/pixels" or image data in the "raw domain," may then be processed by the ISP sub-system 32, such as by using a demosaicing technique, to convert the raw image data into a full color image. In one embodiment, this may be accomplished by interpolating a set of red, green, and blue values for each pixel using a demosaicing algorithm.

The ISP sub-system 32 may provide for various image processing operations, such as defective pixel correction logic, lens shading correction, demosaicing, and image sharpening, noise reduction, gamma correction, image enhancement, color-space conversion, image compression, chroma sub-sampling, and image scaling operations, and so forth. In some embodiments, the ISP sub-system 32 may include various sub-components and/or discrete units of logic that collectively form an image processing "pipeline" for performing each of the various image processing steps. In further embodiments, the ISP sub-system 32 may include a "front-end" processing unit provided upstream from the image processing pipeline to apply certain "pre-processing" operations and to acquire statistics information pertaining to the image data prior to sending the image data to the pipeline. By way of example, the front-end processing unit may include a front-end statistics engine, a temporal filter, defective pixel correction logic, a spatial filter, and a binning compensation filter. The ISP sub-system 32 may also include a "back-end" processing unit provided downstream from the image processing pipe to apply certain "post-processing" operations, which may include face/feature detection processing, local tone mapping, and a back-end statistics engine. These various subcomponents of the ISP sub-system 32 may be implemented using hardware (e.g., digital signal processors, ASICs, system-on-chip solutions) or software, or via a combination of hardware and software components.

Before continuing, it should be noted that while various embodiments of the image processing techniques discussed below may utilize a Bayer CFA, the presently disclosed techniques are not intended to be limited in this regard. Indeed, those skilled in the art will appreciate that the image processing techniques provided herein may be applicable to any suitable type of color filter array, including RGBW filters, CYGM filters, and so forth.

As mentioned above, the electronic device 10 may take the form of a computer, including computers that are generally portable (such as laptop, notebook, netbooks, and tablet computers) as well as computers that are generally non-portable (such as desktop computers, workstations and/or servers), or other type of electronic device, such as handheld portable electronic devices (e.g., digital media player or mobile phone). In particular, FIG. 3 depicts the electronic device 10 in the form of a computer 40, and FIGS. 4 and 5 show front and rear views, respectively, of the electronic device 10 in the form of a handheld portable device 50.

As shown in FIG. 3, the depicted computer 40, which is depicted as a laptop computer, includes a housing 42, the display 28, the I/O ports 12, and the input structures 14. The input structures 14 may include a keyboard and a touchpad mouse that are integrated with the housing 42. Additionally, the input structures 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, a DisplayPort display interface port, or any other type of port that is suitable for connecting to an external device. Additionally, the computer 40 may include network connectivity via the network device 26 (e.g., LAN or wireless networking connectivity), memory (e.g., memory 18), and storage capabilities (e.g., storage device 20).

Further, the laptop computer 40, in the illustrated embodiment, may include an integrated image capture device 30 (e.g., camera). In other embodiments, the laptop computer 40 may utilize an external camera (e.g., an external USB camera or a "webcam") connected to one or more of the I/O ports 12 instead of or in addition to the integrated camera 30. By way of example, the image capture device 30 shown in FIG. 3 may include a model of an iSight® camera available from Apple Inc. The camera 30, whether integrated or external, may provide the function of capturing and recording both still images and video. Such images may then be viewed by a user using an image viewing application, or may be utilized by other applications, including video-conferencing applications, such as iChat® or FaceTime®, and image editing/viewing applications, such as PhotoBooth®, Aperture®, iPhoto®, or Preview®, all of which are available from Apple Inc. In certain embodiments, the depicted computer 40 may be a model of a notebook computer, such as a MacBook®, MacBook® Pro, MacBook Air®, or PowerBook®, available from Apple Inc. The computer 40 may also be a model of a desktop computer, such as a Mac® Pro, iMac®, or Mac® Mini, or a portable tablet computer, such as a model of an iPad®, all available from Apple Inc.

Figure 4:
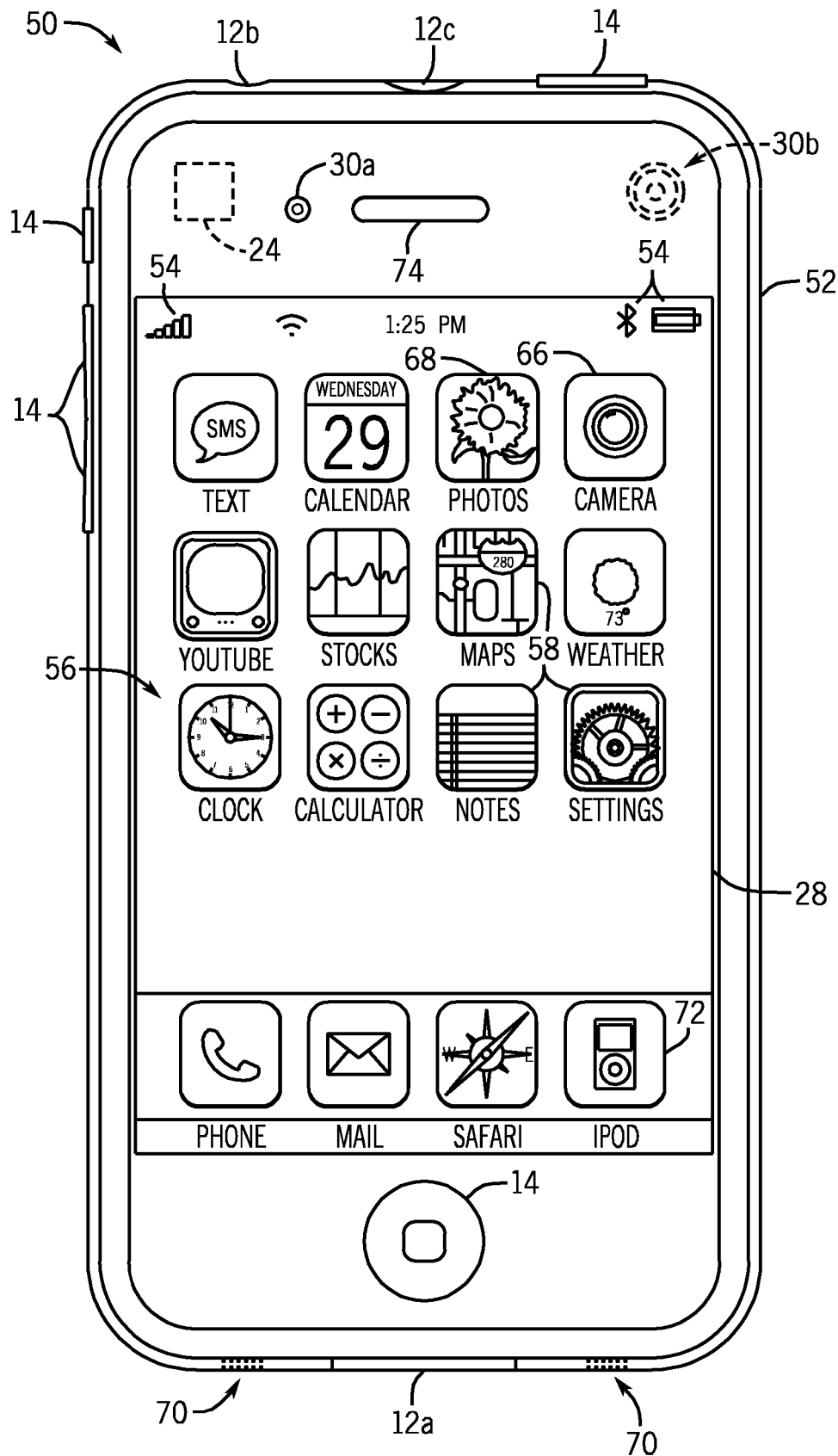
FIG. 4 is a front view of the electronic device of FIG. 1 in the form of a handheld portable electronic device in accordance with aspects of the present disclosure.
Figure 5:
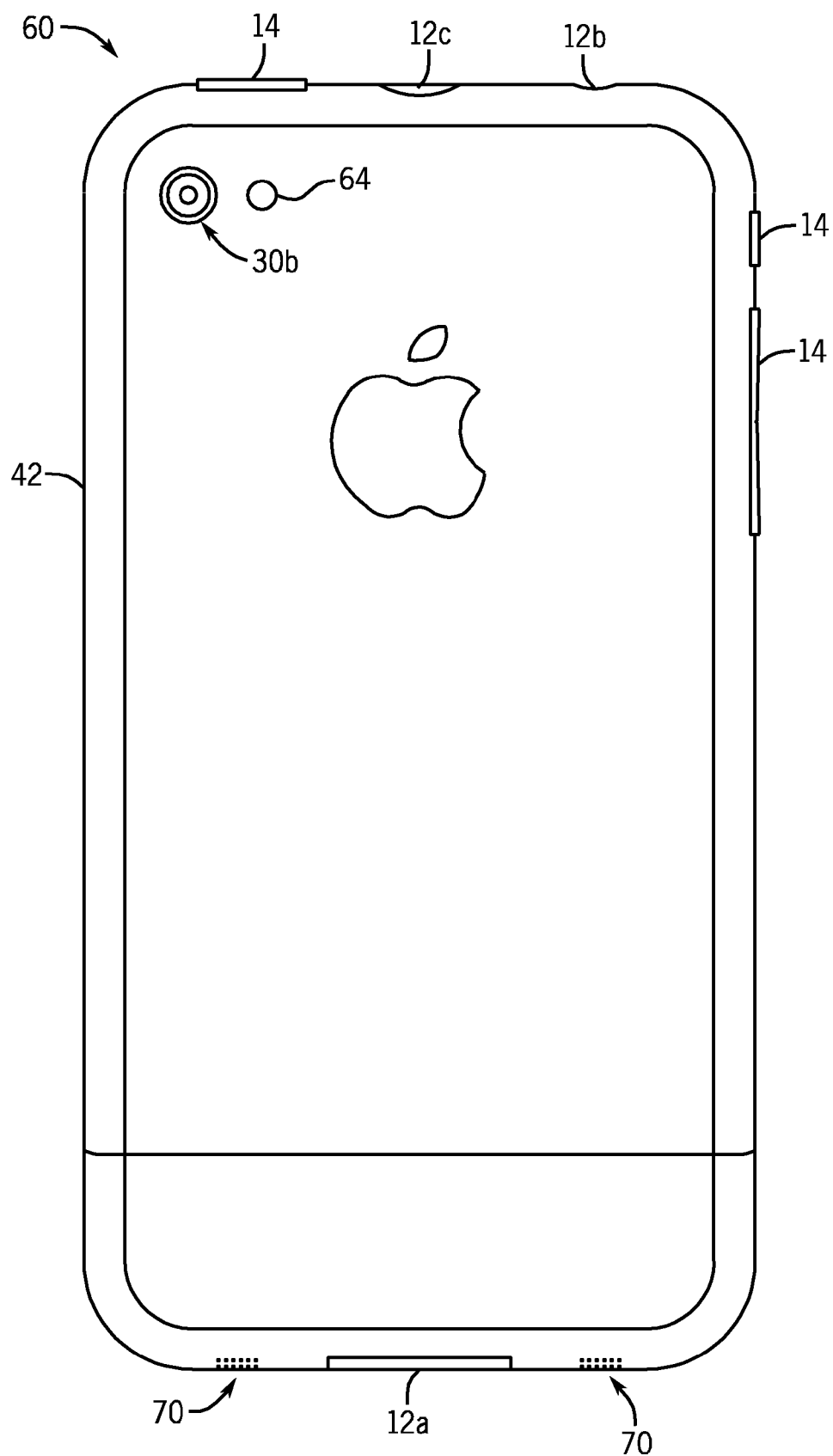
FIG. 5 is a rear view of the handheld electronic device shown in FIG. 4.

Continuing to FIGS. 4 and 5, the electronic device 10 is further illustrated in the form of a portable handheld electronic device 50, which may be a model of an iPod®, such as an iPod Touch®, or iPhone® available from Apple Inc. The handheld device 50 includes an enclosure 52, which may function to protect the interior components from physical damage and to shield them from electromagnetic interference (EMI). The enclosure 52 may be formed from any suitable material or combination of materials, such as plastic, metal, alloy, or a composite material, and may allow certain frequencies of electromagnetic radiation, such as wireless networking (e.g., 802.11 a/b/g/n networking) and/or telecommunication signals (e.g., GPRS, EDGE, 3G, LTE, etc.), to pass through to wireless communication circuitry (e.g., network device 24), which may be disposed within the enclosure 52, as shown in FIG. 4.

The enclosure 52 also includes various user input structures 14 through which a user may interface with the handheld device 50. For instance, each input structure 14 may be configured to control one or more respective device functions when pressed or actuated. By way of example, one or more of the input structures 14 may be configured to invoke a "home" screen or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 60 may include any number of suitable user input structures existing in various forms including buttons, switches, keys, knobs, scroll wheels, and so forth.

The handheld device 60 may include various I/O ports 12. For instance, the depicted I/O ports 12 may include a proprietary connection port 12a for transmitting and receiving data (e.g., such as a 30-pin dock connector available from Apple Inc.) and for charging a power source 26, which may include one or more removable, rechargeable, and/or replaceable batteries. The I/O ports may also include an audio connection port 12b for connecting the device 50 to an audio output device (e.g., headphones or speakers). Further, in embodiments where the handheld device 50 provides mobile phone functionality, the I/O port 12c may be provided for receiving a subscriber identify module (SIM) card (e.g., an expansion card 22).

The display device 28, which may be an LCD, OLED, or any suitable type of display, may display various images generated by the handheld device 50. For example, the display 28 may display various system indicators 54 for providing feedback to a user with regard to one or more states of handheld device 50, such as power status, signal strength, external device connections, and so forth. The display 28 may also display a graphical user interface (GUI) 56 that allows a user to interact with the device 50. In certain embodiments, the presently displayed screen image of the GUI 56 may represent a home-screen of an operating system running on the device 50, which may be a version of the MacOS® or iOS® (iPhone OS®) operating systems, available from Apple Inc.

The GUI 56 may include various graphical elements, such as icons 58 that may correspond to various applications that may be opened or executed upon user selection (e.g., receiving a user input corresponding to the selection of a particular icon 58). In some embodiments, the selection of an icon 58 may lead to a hierarchical navigation process, such that selection of an icon 58 leads to a screen or opens another graphical window that includes one or more additional icons or other GUI elements. In the illustrated embodiment, one of the icons 58 may represent a camera application 66 that may be used in conjunction with one or both of a first front-facing camera 30*a* located on the front side of the device 50 and a second rear-facing camera 30*b* (shown in phantom lines in FIG. 4) on the rear of the device 50 for acquiring images. Referring briefly to FIG. 5, a rear view of the handheld device 50 is illustrated showing the rear-facing camera 30*b* as being integrated with the housing 42 and positioned on the rear of the handheld device 50. In the illustrated embodiment, the rear of the handheld device 50 may include a flash module (also referred to as a strobe) 64, which may be used to illuminate an image scene being captured using the rear-facing camera 30*b*. By way of example, the flash module 64 may include a xenon lighting device and/or a light emitting diode (LED).

As mentioned above, image data acquired using the camera (30*a* or 30*b*) may be processed using the ISP sub-system 32, which may include hardware (e.g., disposed within the enclosure 52) and/or software stored on one or more storage devices (e.g., memory 18 or non-volatile storage 20) of the device 50. For example, images acquired using the camera application 66 and the cameras 30 may be stored on the device 50 (e.g., in storage device 20) and may be viewed at a later time using a photo viewing application 68. In one embodiment, the front and rear facing cameras 30*a* and 30*b* may be utilized to provide video-conferencing capabilities, such as through the use of a video-conferencing application based upon FaceTime®, available from Apple Inc.

The handheld device 50 may also include various audio input and output elements. For example, the audio input/output elements 70, may include an input receiver, such as a microphone. For instance, where the handheld device 50 includes mobile phone functionality, the input receivers may be configured to receive user audio input, such as a user's voice. Additionally, the audio input/output elements 70 may include one or more output transmitters. Such output transmitters may include one or more speakers which may function to transmit audio signals to a user, such as during the playback of music data using a media player application 72. In a mobile phone embodiment of the handheld device 50, an additional audio output transmitter 74 may be provided, as shown in FIG. 4. Like the output transmitters of the audio input/output elements 70, the output transmitter 74 may also include one or more speakers configured to transmit audio signals to a user, such as voice data received during a telephone call. Thus, the audio input/output elements 70 and 74 may collectively function as the audio receiving and transmitting elements of a telephone.

Having now provided some context with regard to various form factors that the electronic device 10 may take, the present disclosure will now focus on certain aspects of the image signal processing (ISP) sub-system 32 depicted in FIG. 1. As mentioned above, the image processing circuitry 32 may be implemented using hardware and/or software components, and may include various processing units that define at least one of an ISP front-end processing unit, an ISP processing pipeline and an ISP back-end processing unit. In particular, the following discussion may focus on certain aspects of the image processing techniques set forth in the present disclosure, particularly those relating to spatial filtering of image pixels captures by the image capture device 30.

Figure 6:
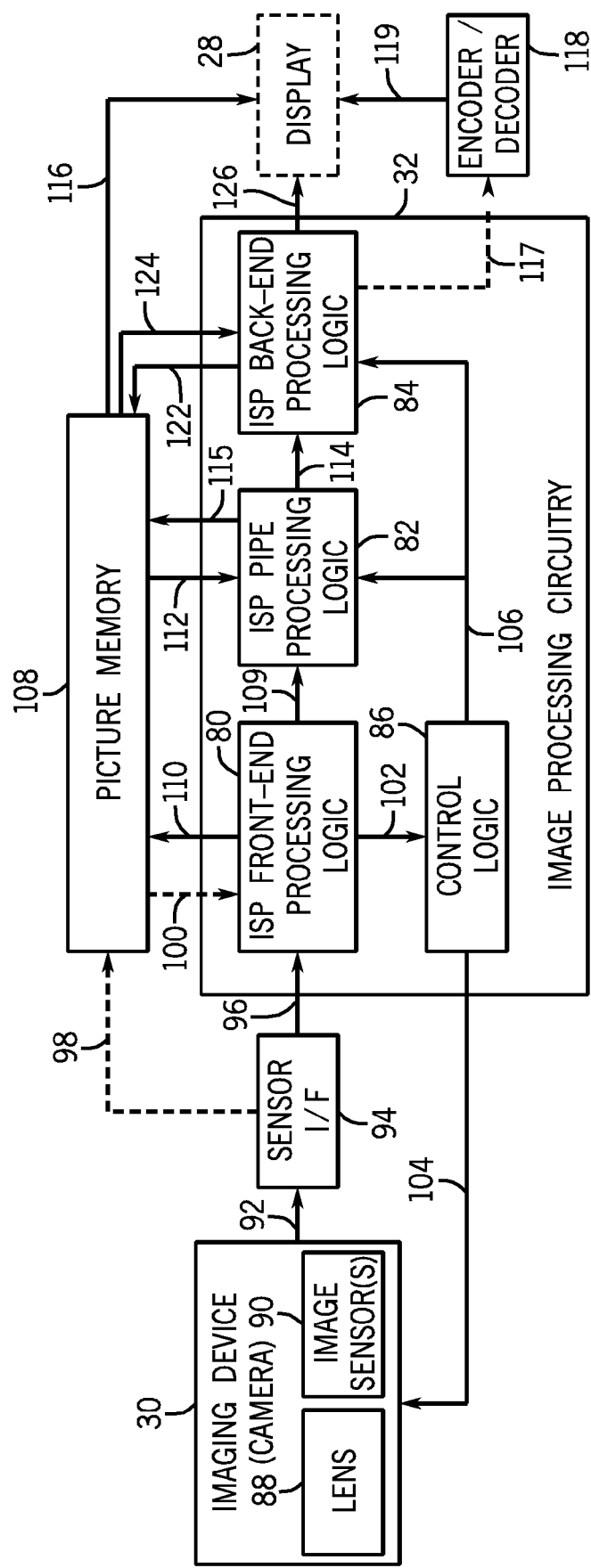
FIG. 6 is a block diagram illustrating an embodiment of the image processing circuitry that may be implemented in the electronic device of FIG. 1, and which is shown as being an image signal processing (ISP) sub-system including ISP front-end processing logic, an ISP pipeline, and ISP back-end processing logic in accordance with aspects of the present disclosure.

A simplified block diagram depicting several functional components that may be implemented as part of the ISP sub-system 32 is illustrated in FIG. 6, in accordance with an embodiment of the present disclosure. Particularly, FIG. 6 is intended to illustrate how image data captured via the image capture device(s) 30 may flow through the ISP sub-system 32. In order to provide a general overview of the image processing circuitry 32, a general description of how these functional components operate to process image data is provided here with reference to FIG. 6, while a more specific description of certain operations, such as the spatial filtering techniques discussed above, is provided further below. As shown in the illustrated embodiment, the ISP sub-system 32 may include the above-mentioned ISP front-end processing logic 80, ISP pipeline processing logic 82, and ISP back-end processing logic 84. Control logic 86, which may include one or more dedicated (e.g., separate from a main processor or CPU of the device 10) processors configured to execute image signal processing firmware, is also provided in the present embodiment. Further, the illustrated, the ISP sub-system 32 may be communicatively coupled to a memory device 108 (which may be part of memory 18 and/or non-volatile storage 20). In certain embodiments, the ISP sub-system 32 may communicate with the memory 108 by way of a direct memory access (DMA) interface using a data bus, which may be based upon the Advanced Microcontroller Bus Architecture (e.g., such as an Advanced Extensible Interface (AXI) bus).

Image data may be captured by the image capture device 30 as raw image data (e.g. Bayer image data) in frames, and each frame may first be processed on a pixel-by-pixel basis using the ISP front-end logic 80. For instance, as shown in FIG. 6, the image capture device 30 may include a camera having one or more lenses 88 and image sensor(s) 90. As discussed above, the image sensor(s) 90 may include a color filter array (e.g., a Bayer filter) and may thus provide both light intensity and wavelength information captured by each imaging pixel of the image sensors 90 to provide of set of raw image data that may be processed by the ISP front-end logic 80. For instance, the raw pixel output 92 from the image capture device 30 may be provided to the ISP front-end logic 80 of the ISP sub-system 32 by way of a sensor interface 94 as an input signal 96 consisting of raw image pixels. By way of example, the sensor interface 94 may utilize a Standard Mobile Imaging Architecture (SMIA) interface or any other suitable serial or parallel image sensor interface, or a combination of such interfaces. In certain embodiments, the ISP front-end logic 80 may operate within its own clock domain and may provide an asynchronous interface to the sensor interface 94 to support image sensors of different sizes and having different timing requirements. The sensor interface 94 may include, in some embodiments, a sub-interface on the sensor side (e.g., sensor-side interface) and a sub-interface on the ISP front-end side, with the sub-interfaces forming the sensor interface 94. The sensor interface 94 may also provide the image data to memory 108, as indicated by signal 98, and may be read from memory 108 by the ISP front-end logic 80, as indicated by signal 100.

The raw image data 96 (or 100) may be provided to the ISP front-end logic 80 and processed on a pixel-by-pixel basis in a number of formats. For instance, in one embodiment, the ISP front-end logic 80 may support raw pixel data having bit-depths of 8, 10, 12, 14, or 16 bits. In certain embodiments, the ISP front-end logic 80 may include a statistics collection block and a front-end pixel processing block, which is illustrated in more detail below in FIG. 7. The statistics collection block may include sub-units of logic configured to apply various pixel processing operations, such as defective pixel replacement, black level compensation, and lens shading correction operations, prior to processing the raw pixels using a statistics engine for determination of various image statistics, such as those related to auto-white balance, auto-focus, auto-exposure, and flicker detection. Additionally, the front-end pixel processing logic of the ISP front-end logic 80 may include sub-units of logic that may be configured to apply certain pre-processing operations to the raw image pixels prior to sending the raw image pixels to the downstream ISP pipeline 82 or to memory 108. For instance, the front-end pixel processing logic may implement temporal filtering logic, defective pixel correction logic, spatial filtering logic, and binning compensation filtering logic, as discussed in more detail below in FIG. 8. In some embodiments, certain components of the ISP front-end logic 80, including the front-end statistics engine, may be implemented in accordance with techniques disclosed in U.S. patent application Ser. No. 12/789,810 entitled "Image Signal Processor Front-End Image Data Processing System and Method," which was filed on May 28, 2010 and assigned to the assignee of the present disclosure, the entirety of which is incorporated herein by reference.

The raw image data processed by the ISP front-end logic 80 may then be provided to the ISP pipeline 82 (output signal 109) for additional processing or may be sent to the memory (output signal 110). The ISP pipeline 82 receives the processed raw image data, either directly form the ISP front-end logic 80 (by signal 109) or from the memory 108 (input signal 112), and may provide for additional processing operations to covert the raw pixel data into a corresponding set of color RGB data (e.g., using a demosaicing algorithm) and/or a corresponding set of image data in a luma and chroma (YCC) color space. In certain embodiments, the ISP pipeline 82 may be of a generally type disclosed in U.S. patent application Ser. No. 12/789,815 entitled "System and Method for Processing Image Data Using an Image Processing Pipeline of an Image Signal Processor," which was filed on May 28, 2010 and assigned to the assignee of the present disclosure, the entirety of which is incorporated herein by reference.

Image data processed by the ISP pipeline 82 may then be output (signal 114) to the ISP back-end processing logic 84 or to memory 108 (signal 115). As discussed above, the back-end processing logic 84 may receive the signal 114 from the ISP pipeline 82 or may retrieve image data processed by the ISP pipeline 82 from memory 108 (signal 124) and may apply one or more additional post-processing operations to the image data. In one embodiment of the ISP-back-end logic 120 may provide for dynamic range compression of image data using local tone mapping operators, brightness, contrast, and color adjustments, as well as scaling logic for scaling the image data to one or more desired resolutions (e.g., based upon a resolution of an output display device). The ISP-back-end logic 84 may also include feature detection logic configured to identify areas in which faces and/or facial features or other types of features (e.g., corners) are located and/or positioned within the image data. Feature detection data may be fed to the front-end statistics processing unit as feedback data for determination of certain image statistics. In some embodiments, feature detection data may also be provided to a back-end statistics engine and/or a compression/decompression engine 118 (e.g., as part of signal 117). For instance, the feature detection data may be utilized to control quantization parameters, wherein when encoding or compressing the output image data (e.g., in macroblocks) quantization may be reduced for areas of the image that have been determined to include certain features (e.g., faces and/or facial features), thus improving the visual quality of such features when the image is displayed and viewed by a user. In certain embodiments, the ISP back-end processing unit 84 of FIG. 6 may be implemented using techniques generally disclosed in U.S. patent application Ser. No. 12/894,833 entitled "System and Method for Processing Image Data Using an Image Signal Processor Having Back-end Processing Logic," which was filed on Sep. 30, 2010 and assigned to the assignee of the present disclosure, the entirety of which is incorporated herein by reference.

Image data processed by the ISP back-end logic 84 may be output (signal 126) to the display 28 for viewing by a user and/or may be further processed by a graphics engine or GPU. Additionally, output from the ISP back-end logic 84 may be sent to memory 108 (signal 122) and the display 28 may read the image data from memory 108 (signal 116), which may, in certain embodiments, be configured to implement one or more frame buffers. Further, as discussed above, in some implementations, the output of the ISP back-end logic 84 may also be provided to the compression/decompression engine 118 (signal 117) for encoding/decoding the image data. The encoded image data may be stored and then later decompressed prior to being displayed on the display 28 device (signal 119). In one embodiment, the compression engine or "encoder" 118 include a H.264/JPEG encoder/decoder.

As further shown in FIG. 6, statistics data, represented by signal 102, may be provided from the ISP front-end logic 80 to a control logic 86. For instance, the statistics data 102 may include image sensor statistics relating to auto-exposure, auto-white balance, auto-focus, flicker detection, and so forth. The control logic 86 may process the statistics data to determine one or more control parameters 104 for the image capture device(s) 30, as well as one or more control parameters 106 for the ISP pipeline 82 and ISP back-end logic 84. For instance, control parameters 104 may include image sensor control parameters (e.g., gains, integration time for exposure control, etc.), camera flash control parameters (e.g., flash timing parameters), lens control parameters (e.g., focal length for focusing or zoom), or a combination of such parameters. Control parameters 106 may include gain levels, coefficients for color correction matrices (CCM) that may be used for auto-white balance and/or color adjustments (e.g., during RGB processing), as well as lens shading correction parameters.

Figure 7:
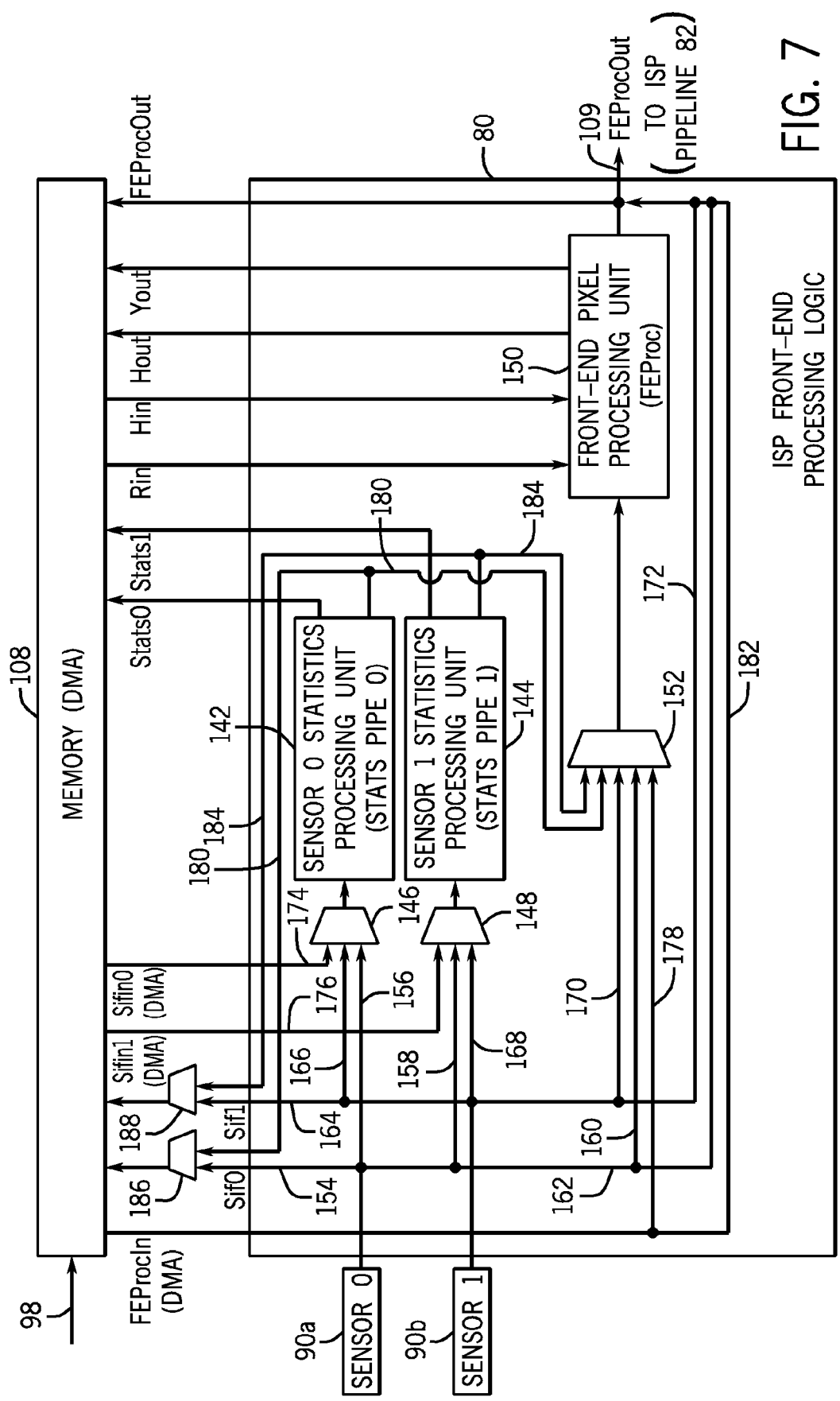
FIG. 7 is a more detailed block diagram showing an embodiment of the ISP front-end logic that may be implemented in the ISP sub-system of FIG. 6 in accordance with aspects of the present disclosure.

FIG. 7 shows a more detailed block diagram of the ISP front-end logic 80 discussed in FIG. 6, in accordance with one embodiment. The depicted image sensors 90a and 90b (which may correspond to the cameras 30 and 30b, respectively, of FIGS. 4 and 5) may provide raw image data as signals Sif0 and Sif1, respectively. Each of the image sensors 90a and 90b may be generally associated with respective statistics processing units 142 (StatsPipe0) and 144 (StatsPipe1), which may be configured to process the raw image data to acquire one or more image statistic parameters (as indicated by signals Stats0 and Stats1). For instance, the image statistics may include parameters relating to auto-exposure, auto-white balance, auto-focus, flicker detection, and so forth.

In certain embodiments, when only one of the sensors 90a or 90b is acquiring image, the image data may be sent to both StatsPipe0 and StatsPipe1 if additional statistics are desired. For instance, if StatsPipe0 and StatsPipe1 are both available (e.g., only image sensor is sending data), they may be utilized in parallel, wherein StatsPipe0 may collect statistics for one color space (e.g., RGB), and StatsPipe1 may collect statistics for another color space (e.g., luma and chroma (YCC)). In certain embodiments, StatsPipe0 and StatsPipe1 may include a statistics engine implemented in accordance with one or more of the statistics processing techniques disclosed in U.S. patent application Ser. No. 12/873,999 entitled "Techniques for Acquiring and Processing Statistics Data in an Image Signal Processor," Ser. No. 12/873,989 entitled "Techniques for Collection of Auto-Focus Statistics," Ser. No. 12/873,978 entitled "Auto-Focus Control Using Image Statistics Data with Coarse and Fine Auto-Focus Scores," and Ser. No. 12/873,973 entitled "Flexible Color Space Selection for Auto-White Balance Processing," all of which were filed on Sep. 1, 2010 and assigned to the assignee of the present disclosure, the entireties of which are incorporated herein by reference.

As shown in FIG. 7, five asynchronous input sources of data are provided in the ISP front-end 80. These include (1) a direct input source (Sif0) from a sensor interface corresponding to Sensor0 (90a), (2) a direct input source (Sif1) from a sensor interface corresponding to Sensor1 (90b), (3) an input source corresponding to Sensor0 data from memory 108 (referred to as SifIn0), (4) an input source corresponding to Sensor1 data from the memory 108 (referred to as SifIn1), and (5) an input source that may include frames from both Sensor0 and Sensor1 that are retrieved from memory 108 (referred to as FeProcIn). Multiple destinations to which image data from these sources may be routed are also provided, wherein each destination may be either storage locations in memory 108 or a processing unit within the ISP front-end logic 80. For instance, in the present embodiment, six destinations are provided: (1) an interface to memory 108 for receiving Sensor0 data, (2) an interface to memory 108 for receiving Sensor1 data, (3) the statistics processing unit 142 (StatsPipe0), (4) the statistics processing unit 144 (StatsPipe1), (5) a front-end pixel processing unit (FEProc) 150, and (6) an output signal (FEProcOut) to memory 108 and/or the ISP pipeline 82 (as signal 109).

As illustrated, source Sif0 (sensor interface of Sensor0) may be configured to provide data to destinations SIf0DMA (signal 154), StatsPipe0 (signal 156), StatsPipe1 (signal 158), FEProc (signal 160), or FEProcOut (signal 162). With regard to FEProcOut, source data may, in some instances, be provided to FEProcOut to bypass pixel processing by FEProc 150, such as for debugging, initialization, and/or testing purposes. Source Sif1 (sensor interface of Sensor1) may be configured to provide data to destinations SIf1DMA (signal 164), StatsPipe0 (signal 166), StatsPipe1 (signal 168), FEProc (signal 170), or FEOut (signal 172). Source SifIn0 (Sensor0 data from memory 108) may be configured to provide data to StatsPipe0 (signal 174), and source SifIn1 (Sensor1 data from memory 108) may be configured to provide data to StatsPipe1 (signal 176). Further, source FEProcIn (Sensor0 and Sensor1 data from memory 108) may be configured to provide data to FEProc (signal 178) and FEProcOut (signal 182).

As various combinations of source-to-destination routing are possible within the ISP front-end processing unit 80, various selection blocks are provided to control the routing of image data to one or more desired destinations. For instance, in the illustrated embodiment, an input to StatsPipe0 (142) may be selected from one of the available inputs 156, 166, and 174, as determined by selection logic 146. Similarly, selection logic 148 may select an input to StatsPipe1 (144) from the signals 158, 176, and 168, and selection logic 152 may select an input to the front-end pixel processing unit (FEProc) from the signals 160, 170, and 178. As mentioned above, the statistics data (Stats0 and Stats1) may be provided to the control logic 86 for the determination of various control parameters that may be used to operate the image capture device(s) 30 and/or the ISP pipeline logic 82. As can be appreciated, the selection logic blocks (146, 148, and 152) shown in FIG. 7 may be provided by any suitable type of logic, such as a multiplexer that selects one of multiple input signals in response to a control signal.

The pixel processing unit (FEProc) 150 may be configured to perform various image pre-processing operations on the raw image data on a pixel-by-pixel basis before the image data is sent to the ISP pipeline 82 for further processing. As shown, FEProc 150, as a destination processing unit, may receive image data from sources Sensor0 (signal 160), Sensor1 (signal 170), or ProcInDMA (signal 178) by way of the selection logic 152. FEProc 150 may also receive and output various signals (e.g., Rin, Hin, Hout, and Yout—which may represent motion history and luma data used for temporal filtering) when performing the pixel processing operations, which may include temporal filtering, defective pixel correction, spatial filtering, and binning compensation filtering, as will be discussed further below.

Further, as shown in FIG. 7, the selection logic 152, in addition to receiving the signals 160, 170, and 178, may also receive the signals 180 and 184. As discussed above, the statistics processing units 142 and 144 may apply certain pre-processing operations to the pixel data prior to processing the pixel data for extraction of statistics. The signal 180 may represented the pre-processed raw image data from StatsPipe0 that is provided to its respective statistics engine and the signal 184 may represent pre-processed raw image data from StatsPipe1 that is provided to its respective statistics engine. In one embodiment, each of the statistics processing units may apply one or more pre-processing operations to the raw image data before collecting statistics. Such operations may include defective pixel detection/replacement, lens shading correction, black level compensation, and inverse black level compensation, as generally disclosed in the above-referenced co-pending U.S. patent application Ser. No. 12/789,810. Accordingly, selection logic 152 gives the front-end pixel processing unit 150 the flexibility of receiving either un-pre-processed raw image data from the Sensor0 (signal 160) and Sensor1 (signal 170) or pre-processed raw image data from StatsPipe0 (signal 180) and StatsPipe1 (signal 184). Additionally, as shown by selection logic units 186 and 188, the ISP front-end processing logic 80 also has the flexibility of writing either un-pre-processed raw image data from Sensor0 (signal 154) or Sensor1 (signal 164) to the memory 108, or writing pre-processed raw image data from StatsPipe0 (signal 180) or StatsPipe1 (signal 184) to the memory 108.

Figure 8:
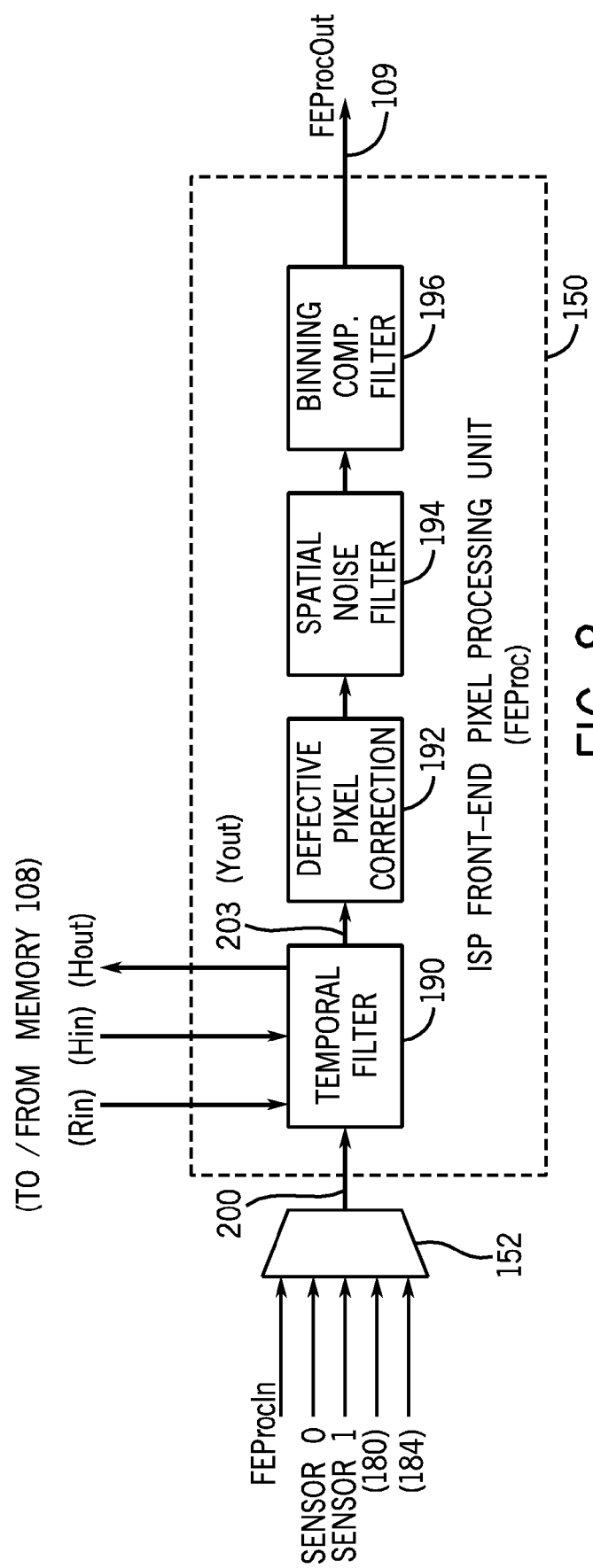
FIG. 8 is a block diagram that provides a more detailed view of one embodiment of an ISP front-end pixel processing unit, as shown in the ISP front-end logic of FIG. 10 in accordance with aspects of the present disclosure.

Continuing to FIG. 8, a more detailed view of the ISP front-end pixel processing logic (FEProc) 150 is illustrated, in accordance with an embodiment this disclosure. In the present embodiment, the ISP front-end pixel processing logic 150 includes a temporal filter 190, a defective pixel correction unit 192, a spatial noise filter 194, and a binning compensation filter 196. The temporal filter 190 may receive a raw pixel input signal 200, which may include Bayer raw image data, provided by the selection logic 152 (e.g., selected from one of the input image signals Sensor0 (Sif0), Sensor1 (Sif1), FEProcIn, or pre-processed image signals 180 or 184). The temporal filter 190 may operate on the raw pixel data 200 before any additional processing is performed. For example, the temporal filter 190 may initially process the image data to reduce noise by averaging image frames in the temporal direction.

Figure 9:
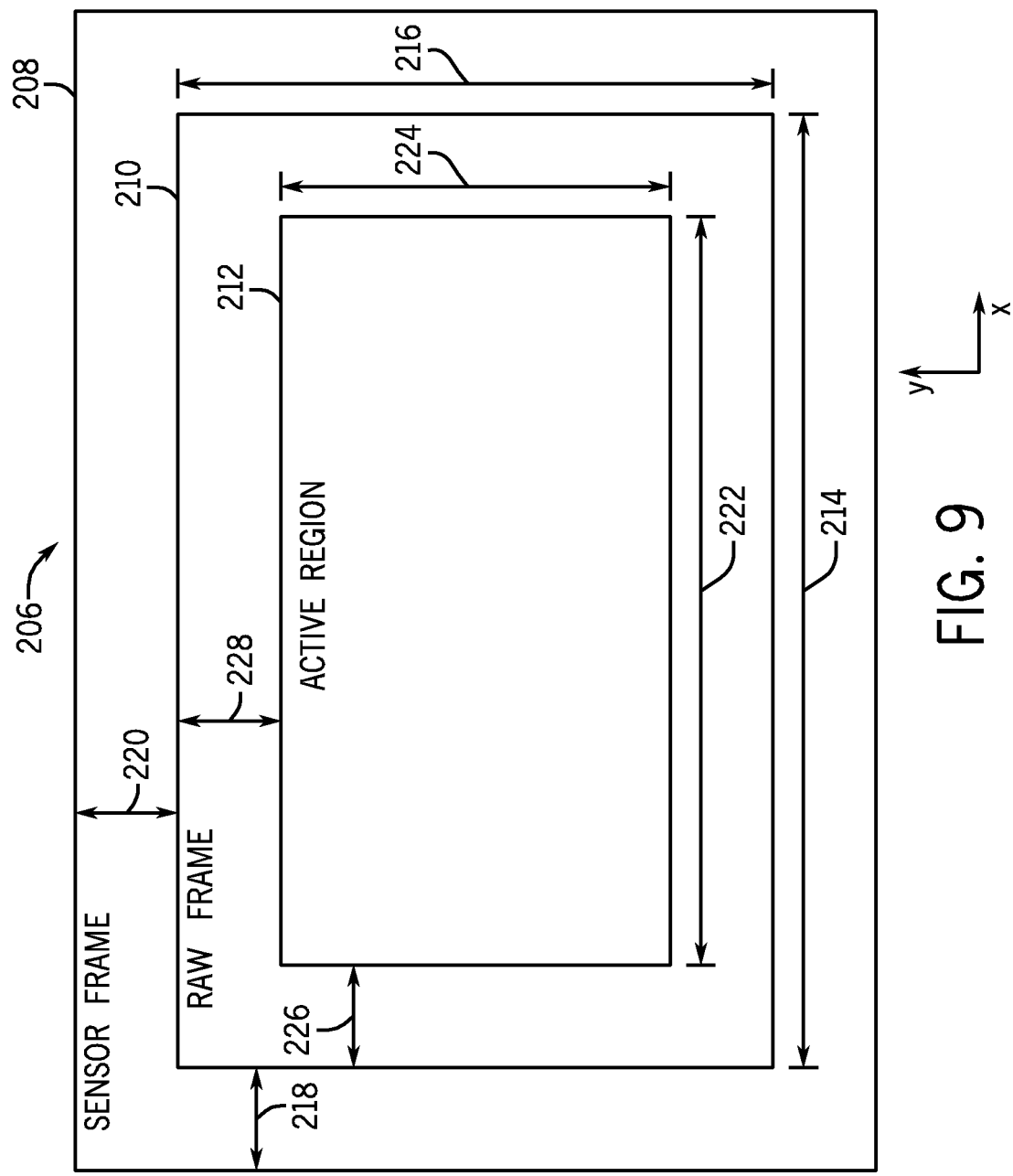
FIG. 9 is graphical depiction of various imaging regions that may be defined within a source image frame captured by an image sensor in accordance with aspects of the present disclosure.

Before continuing, it should be noted that pixels may be sent to the ISP sub-system 32 and ISP front-end processing logic 80 as source frames of image data. For instance, various frame regions that may be defined within an image source frame are shown in FIG. 9. The image source frame 206 may include a sensor frame region 208, a raw frame region 210, and an active region 212. The sensor frame 208 may represent the maximum frame size that the image sensor 90 may provide to the ISP sub-system 32. The raw frame region 210 may be defined as the region of the sensor frame 208 that is sent to the ISP front-end processing logic 80. The active region 212 may be defined as a portion of the sensor frame 208, typically within the raw frame region 210, on which pixel processing is performed for one or more of the various image processing operations carried out by the ISP sub-system 32.

In certain embodiments, the ISP front-end logic 80 receives the raw frame 210. Thus, for the purposes of the present disclosure, a global frame size for the ISP front-end processing logic 80 may be assumed as corresponding to the raw frame size, as determined by the width 314 and height 316. In some embodiments, the offset from the boundaries of the sensor frame 208 to the raw frame 310 may be determined and/or maintained by the control logic 86. For instance, firmware executed by the control logic 86 may determine the raw frame region 210 based upon input parameters, such as an x-offset 218 and the y-offset 220 relative to the sensor frame 208. Further, in some cases, a processing unit within the ISP front-end logic 80, ISP pipeline 82, or ISP back-end logic 84 may have a defined active region, such that pixels located within the raw frame 210 but outside the active region 212 are not be processed, i.e., left unchanged. For instance, an active region 212 for a particular processing unit having a width 222 and height 224 may be defined based upon an x-offset 226 and y-offset 228 relative to the raw frame 210. Further, in instances where an active region 212 is not specifically defined, one embodiment of the ISP sub-system 32 may assume that the active region 212 is the same as the raw frame 210 (e.g., x-offset 226 and y-offset 228 are both equal to 0). Thus, for the purposes of image processing operations performed on the image data, boundary conditions may be defined with respect to the boundaries of the raw frame 210 or active region 212. Further, while the image processing operations performed by the ISP front-end pixel processing unit 150 (FEProc) will be discussed below as being applied to the raw frame 210, it should be understood that in certain embodiments, the ISP front-end pixel processing unit 150 may also define an active region 212, which may be equal to or a sub-region of the raw frame 210, on which pixel processing is to be applied. To simplify the present description, however, a "frame" received by the ISP front-end pixel processing unit 150 should be understood to refer to either the raw frame or action region of the sensor frame.

Referring back to FIG. 8, the temporal filter 190 may be pixel-adaptive based upon motion and brightness characteristics. For instance, when pixel motion is high, the filtering strength may be reduced in order to avoid the appearance of "trailing" or "ghosting artifacts" in the processed image, whereas the filtering strength may be increased when little or no motion is detected. Additionally, the filtering strength may also be adjusted based upon brightness data (e.g., "luma"). For instance, as image brightness increases, filtering artifacts may become more noticeable to the human eye. Thus, the filtering strength may be further reduced when a pixel has a high level of brightness. In applying temporal filtering, the temporal filter 190 may receive reference pixel data (Rin) and motion history input data (Hin), which may be from a previous filtered or original frame. Using these parameters, the temporal filter 190 may provide motion history output data (Hout) and a filtered pixel output Yout, labeled here as reference number 230. This temporal filtering process may be repeated for each pixel of a received raw frame. By way of example only, the temporal filter 190 shown in the ISP front-end pixel processing unit 150 of FIG. 8 may be configured to implement one or more of the temporal filtering techniques disclosed in U.S. patent application Ser. No. 12/789,821 entitled "Temporal Filtering Techniques for Image Signal Processing," which was filed on May 28, 2010 and assigned to the assignee of the present disclosure, the entirety of which is incorporated herein by reference.

The temporally filtered pixel data Yout is then passed to the defective pixel correction (DPC) logic 192, which may be configured to identify defective pixels within an image frame and replace the defective pixels with corrected pixel values. As can be appreciated, defective pixels on the image sensor may attributable to a number of factors, and may include "hot" (or leaky) pixels, "stuck" pixels, and "dead pixels, wherein hot pixels exhibit a higher than normal charge leakage relative to non-defective pixels, and thus may appear brighter than a non-defective pixel, wherein a stuck pixel appears as always being on (e.g., fully charged) and thus may indicate a brightness greater than the expected brightness at a particular pixel location, and wherein a dead pixel appears as always being off. As such, the DPC logic 192 may be configured to implement a pixel detection scheme that is robust enough to identify and address these different types of failure scenarios. For instance, the DPC logic 192 may provide for fixed or static defect detection and correction, dynamic defect detection and correction, as well as speckle removal.

Defective pixel correction/detection performed by the DPC logic 192 may occur independently for each color component of the raw image data 230 (e.g., R, B, Gr, and Gb for Bayer raw data), and may include various operations for detecting defective pixels, as well as for correcting the detected defective pixels. For instance, in one embodiment, the defective pixel detection operations may provide for the detection of static defects, dynamics defects, as well as the detection of speckle, which may refer to electrical interferences or noise (e.g., photon noise) that the image sensor may exhibit. By analogy, speckle may appear on an image as seemingly random noise artifacts (e.g., similar to the manner in which static may appear on a display device, such as a television display). Dynamic defection correction may be regarded as being dynamic in the sense that the characterization of a pixel as being defective at a given time may depend on the image data in the neighboring pixels. For example, a stuck pixel that is always on maximum brightness may not be regarded as a defective pixel if the location of the stuck pixel is in an area of the current image that is dominated by very bright colors. Conversely, if the stuck pixel is in a region of the current image that is dominated by black or darker colors, then the stuck pixel may be identified as a defective pixel during processing by the DPC logic 192 and corrected accordingly.

Static defect detection may be performed in which the location of each pixel is compared to a static defect table, which may store data corresponding to the location of pixels that are known to be defective. For instance, in one embodiment, the DPC logic 192 may monitor the detection of defective pixels (e.g., using a counter or register) and, if a particular pixel is observed as repeatedly failing, the location of that pixel may be stored into the static defect table. Thus, if the location of a current pixel is found in the static defect table during static defect detection, the current pixel may be identified as being a defective pixel and a replacement value is determined and temporarily stored.

In one embodiment, the replacement value may be the value of the previous pixel (based on scan order) of the same color component, and may be used to correct the static defect during dynamic/speckle defect detection and correction, as discussed below. Additionally, if the previous pixel is outside of the raw frame 210 (FIG. 9), then its value is not used, and the static defect may be corrected during the dynamic defect correction process. Further, due to memory considerations, the static defect table may store a finite number of location entries. For instance, in one embodiment, the static defect table may be implemented as a first-in-first-out (FIFO) queue configured to store a total of 16 locations for every two lines of image data. The locations defined in the static defect table will, nonetheless, be corrected using a previous pixel replacement value (rather than via the dynamic defect detection process discussed below). Embodiments of the present technique may also provide for updating the static defect table intermittently over time.

The dynamic defect and speckle detection processes implemented by the DPC logic 192 may be time-shifted with respect to the static defect detection process discussed above. In one embodiment, the dynamic defect and speckle detection process may begin after the static defect detection process has analyzed two scan lines (e.g., rows) of pixels. As can be appreciated, this allows for the identification of static defects and their respective replacement values to be determined before dynamic/speckle detection occurs. For example, during the dynamic/speckle detection process, if the current pixel was previously marked as being a static defect, rather than applying dynamic/speckle detection operations, the static defect is simply corrected using the previously assessed replacement value. By way of example only, in certain embodiments, the DPC logic 192 disclosed herein may be of a type generally disclosed in U.S. patent application Ser. No. 12/582,400 entitled "System and Method for Detecting and Correcting Defective Pixels in an Image Sensor," which was filed on Oct. 20, 2009 and assigned to the assignee of the present disclosure, the entirety of which is incorporated herein by reference.

The output of the DPC logic 192 may then be passed to the spatial noise filter (SNF) 194 for further processing. As shown, the present embodiment of the front-end pixel processing unit 150 provides for defective pixel correction processing prior to spatial filtering. This is because the initial temporal filtering process generally uses only co-located pixels (e.g., pixels from an adjacent frame in the temporal direction), and thus does not spatially spread noise and/or defects. However, spatial filtering filters the pixels in the spatial direction and, therefore, noise and/or defects present in the pixels may be spread spatially. Accordingly, defective pixel correction is applied prior to spatial filtering to reduce the spread of such defects.

In one embodiment, the SNF filter 194 may be implemented as a two-dimensional spatial noise filter that is configured to support both a bilateral filtering mode and a non-local means filtering mode, both of which are discussed in further detail below. The SNF 194 may process the raw pixels to reduce noise by averaging neighboring pixels that are similar in brightness. Referring first to the bilateral mode, this mode may be pixel adaptive based on a brightness difference between a current input pixel and its neighbors, such that when a pixel difference is high, filtering strength is reduced to avoid blurring edges. The SNF 194 operates on raw pixels and may be implemented as a non-separable filter to perform a weighted average of local samples (e.g., neighboring pixels) that are close to a current input pixel both in space and intensity. For instance, in one embodiment, the SNF 194 may include a 7×7 filter (with 49 filter taps) per color component to process a 7×7 block of same-colored pixels within a raw frame (e.g., 210 of FIG. 9), wherein the filter coefficients at each filter tap may adaptively change based upon the similarity (e.g., in brightness) of a pixel at the filter tap when compared to the current input pixel, which may be located at the center within the 7×7 block.

Figure 10:
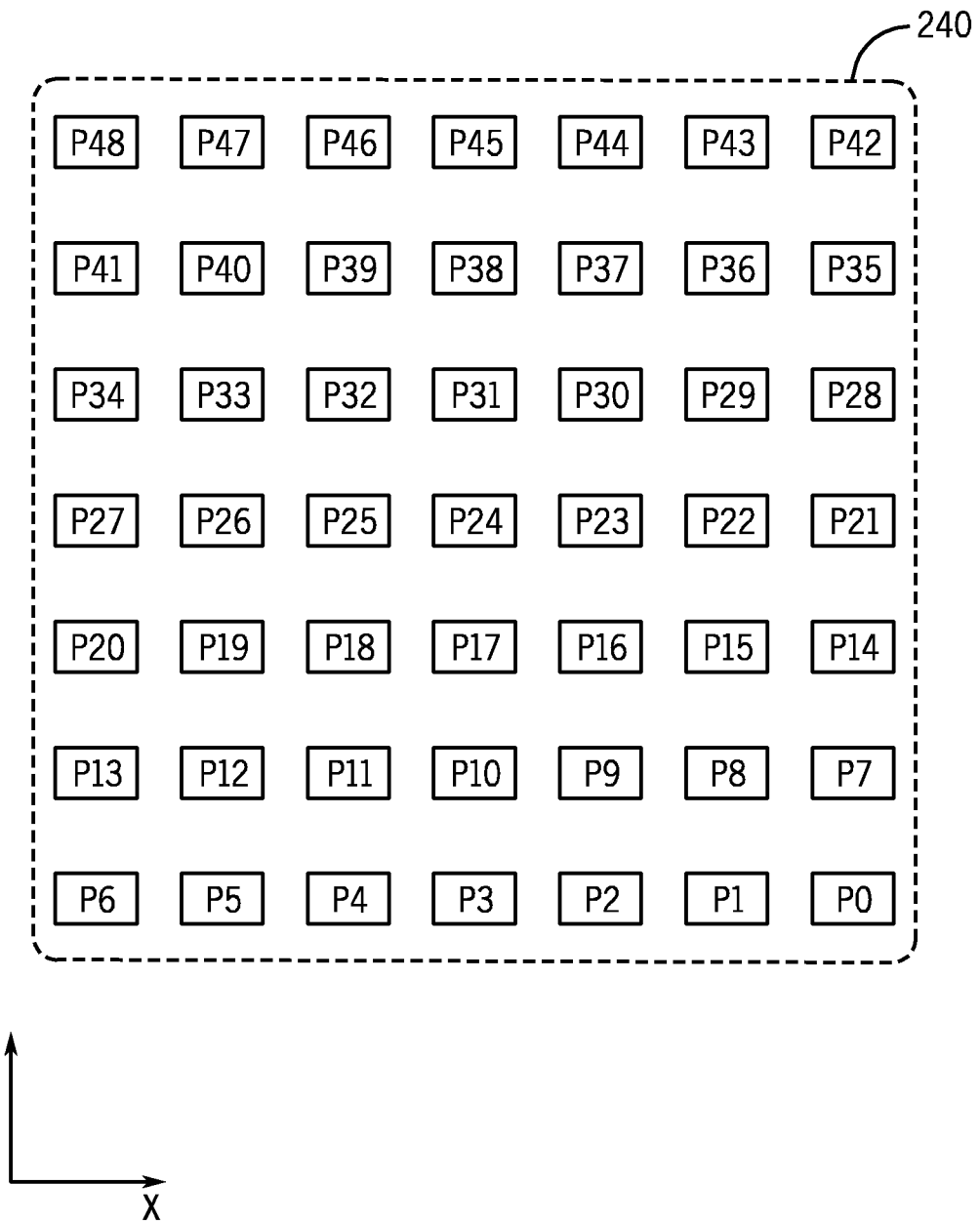
FIG. 10 shows a block of same-colored pixels of a current image frame on which a spatial noise filter of the ISP front-end pixel processing unit may operate in accordance with aspects of the present disclosure.

FIG. 10 shows a 7×7 block of same-colored pixels (P0-P48) on which spatial noise filtering may be applied by the SNF 194, wherein the pixel designated by P24 may be the current input pixel at location (j, i) located at the center of the 7×7 block, and on which spatial filtering is being applied. For instance, assuming the raw image data is Bayer raw image data, all of the pixels in the 7×7 block may be of either red (R) pixels, green (either Gb or Gr) pixels, or blue (B) pixels. Further, while a 7×7 block is shown in the present embodiment, it should be appreciated that smaller or larger pixel block sizes may be used in conjunction with the presently disclosed techniques. For instance, in some embodiments, the SNF 194 may include 9 filter taps and operate on a 3×3 block of same-colored pixels, 25 filter taps and operate on a 5×5 block of same-colored pixels, or may include 81 filter taps and operate on a 9×9 block of same-colored pixels.

Figure 11:
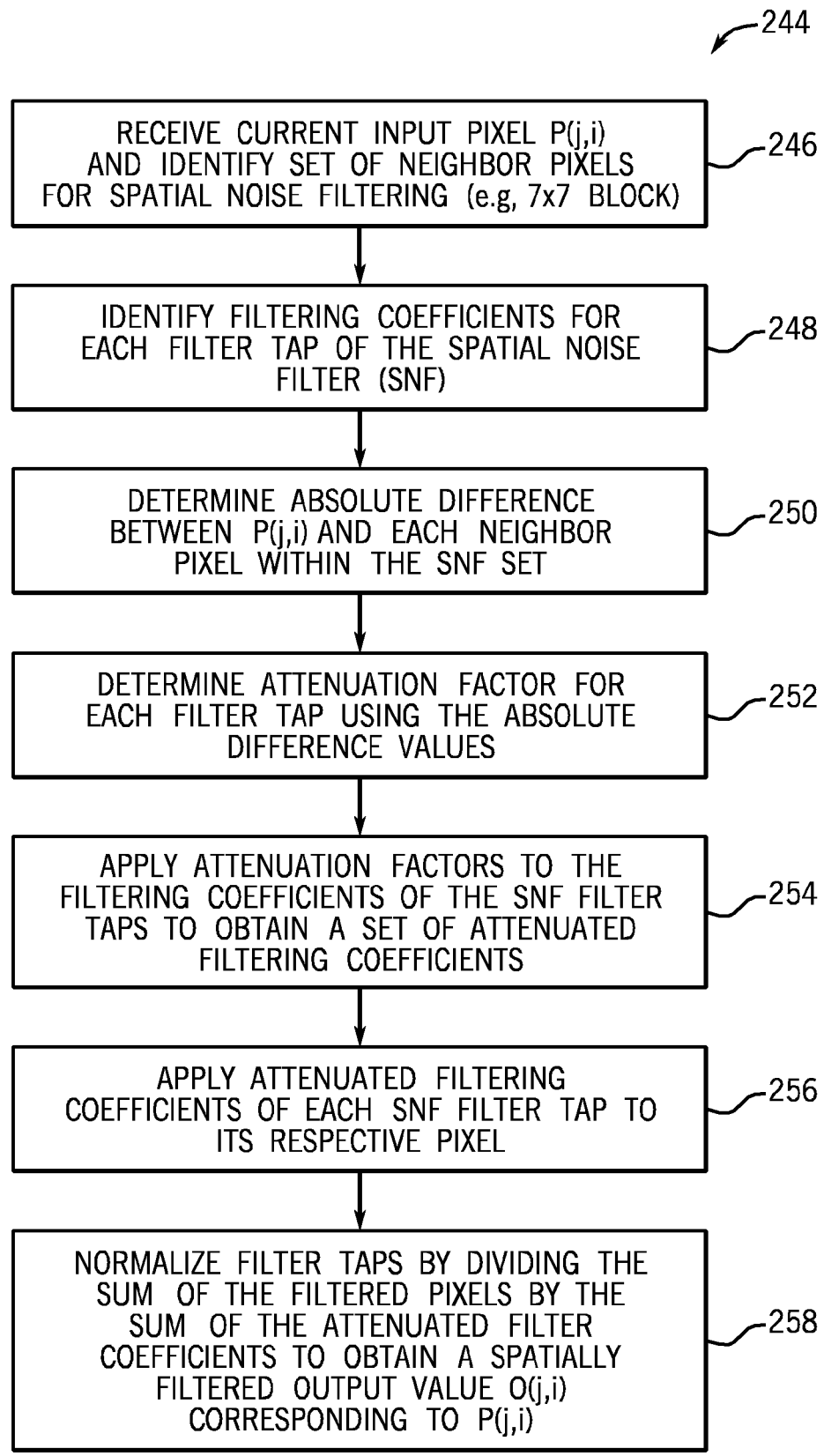
FIG. 11 is a flow chart depicting a process for applying spatial noise filtering in accordance with aspects of the present disclosure.

To more clearly explain the spatial noise filtering process provided by the SNF 194, a general description of the spatial noise filtering process will now be provided with reference to the process 244 depicted in FIG. 11. The process 244 is intended to provide an initial high level overview of the spatial noise filtering process, with more specific details of the spatial noise filtering process, including examples of equations and formulas that may be utilized in certain embodiments, being described further below.

The process 244 begins at block 246, at which a current input pixel P located at spatial location (j, i) is received, and a neighboring set of same-colored pixels for spatial noise filtering is identified. For example, a set of neighbor pixels may correspond to the 7×7 block 240 and the input pixel may be the center pixel P24 of the 7×7 block, as shown above in FIG. 10. Next, at block 248, filtering coefficients for each filter tap of the SNF 194 are identified. In the present embodiment, each filter tap of the SNF filter 194 may correspond to one of the pixels within the 7×7 block and may include a filtering coefficient. Thus, in the present example, a total of 49 filter coefficients may be provided. In certain embodiments, the SNF filtering coefficients may be derived based upon a Gaussian function with a standard deviation measured in pixels.

At block 250, an absolute difference is determined between the input pixel P(j, i) and each of the neighbor pixels within the 7×7 block. This value, delta ($\Delta$) may then be used to determine an attenuation factor for each filter tap of the SNF 194, as indicated by block 252. As will be discussed further below, the attenuation factor for each neighbor pixel may depend on the brightness of the current input pixel P(j, i), the radial distance of the input pixel P(j, i) from the center of the raw frame 210 (FIG. 9), as well as the pixel difference between the input pixel P(j, i) and the neighbor pixel. Thereafter, at block 254, the attenuation factors from block 252 are applied to each respective filter tap of the SNF 194 to obtain a set of attenuated filtering coefficients. At block 256, each attenuated filtering coefficient is applied to its respective pixel within the 7×7 block. Finally, at block 258, a spatially filtered output value O(j, i) that corresponds to the input pixel P(j, i) may be determined by normalizing the filter taps of the SNF 194. In one embodiment, this may include dividing the sum of the filtered pixels from block 256 by the sum of the attenuated filter coefficients from block 254.

Having provided a general description of a spatial filtering process 244 that may be performed by one embodiment of the SNF 194, certain aspects of the process 244 are now described in further detail. For instance with regard to block 250 of the process 244, the absolute difference values may be calculated when operating in the bilateral mode by determining the absolute difference between P(j, i) and each neighbor pixel. For instance, referring to FIG. 10, the absolute difference corresponding to pixel P0 may be the absolute value of (P0-P24), the absolute difference corresponding to pixel P1 may be the absolute value of (P1-P24), the absolute difference corresponding to pixel P2 may be the absolute value of (P2-P24), and so forth. Thus, an absolute difference value for each pixel within the 7×7 block 240 may be determined in this manner to provide a total of 49 absolute difference values. Further, with regard to the 7×7 block 240, if the current input pixel P(j, i) is located near an edge of the raw frame 210, such that there are not enough pixels in one or more directions to complete the 7×7 block, edge pixels of the current color component may be replicated complete the 7×7 block. For instance, suppose a current input pixel is instead at location P31 in FIG. 10. In this scenario, an additional upper row of pixels may be needed to complete the 7×7 block, and this may be accomplished by replicating pixels P42-P48 in the y-direction.

Figure 12:
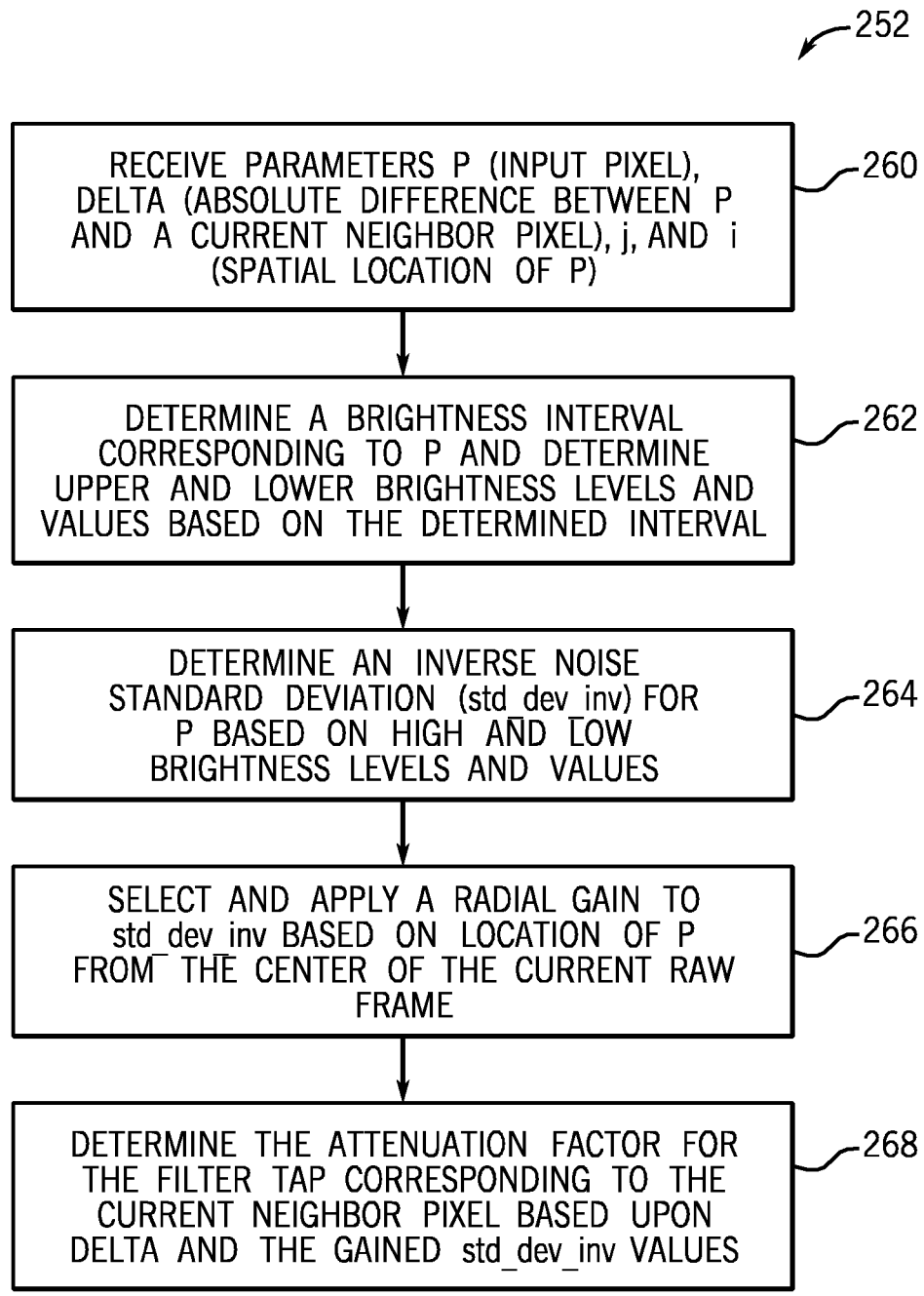
FIG. 12 is a flow chart depicting a process for determining attenuation factors when performing the spatial noise filtering process depicted in FIG. 11 in accordance with one embodiment of the present disclosure.

The block 252 of the process 244 for determining an attenuation factor for each filter tap of the SNF 194 is illustrated in more detail as a sub-process shown in FIG. 12 and including sub-blocks 260-268, in accordance with one embodiment. As shown in FIG. 12, the sub-process 252 may be performed for each pixel of the 7×7 block and begins at sub-block 260, where the parameters delta (Δ) (representing the absolute difference between the input pixel P and a current neighbor pixel), P (representing the value of the input pixel), and the coordinates j and i (representing the spatial location of the input pixel P) are received. At sub-block 262, the value of the input pixel (P) may be evaluated against multiple brightness intervals to identify an interval in which the value P lies. By way of example only, one embodiment may provide a total of 18 brightness intervals (defined by 19 brightness levels), with 16 brightness intervals spanning the range of 0 to $2^{13}$ (8192) in equal intervals (e.g., intervals of 512) and with the last two ($17^{th}$ and $18^{th}$ intervals) being located at $2^{13}+2^{12}$ (12288) and $2^{14}$ (16384), respectively. For instance, a pixel P having a value of 13000 may fall in the interval defined between the $17^{th}$ and $18^{th}$ brightness levels. As can be appreciated, such an embodiment may be employed when the raw pixel data received by the SNF 194 includes 14-bit raw pixel data. If the received pixel data is less than 14-bits, it may be up-sampled, and if the received pixel data is greater than 14-bits, it may be down-sampled prior to being received by the SNF 194. Further, in certain embodiments, the brightness levels and their corresponding brightness values may be stored using a look-up table.

Once the brightness interval corresponding to P is identified, the upper and lower levels of the selected brightness interval from sub-block 262, as well as their corresponding brightness values, may be used to determine an inverse noise standard deviation value (e.g., 1/std_dev) for P, as shown at sub-block 264. In one embodiment, an array of inverse noise standard deviation values may be provided, wherein a standard noise deviation value defined for each brightness level and color component. For instance, the inverse noise standard deviation values may be provided as an array, std_dev_inv[c][brightness_level]:((0≦c≦3); (0≦brightness_level≦18)), wherein the first index element corresponds to a color components [c], which may correspond to four Bayer color components (R, Gb, Gr, B) in the present embodiment, and the second index element corresponds to one of the 19 brightness levels [brightness_level] provided in the present embodiment. Thus, in the present embodiment, a total of 19 brightness-based parameters for each of 4 color components (e.g., the R, Gb, Gr, and B components of Bayer raw pixel data) are provided. The inverse noise standard deviation values may be specified by firmware (e.g., executed by control logic 86).

Further, while the present embodiment depicts the determination of the brightness interval as being based upon a parameter equal to the value (P) of the current input pixel, in other embodiments, the parameter used to determine the brightness interval may be used on an average brightness of a subset of pixels within the 7×7 pixel block that are centered about the current input pixel. For instance, referring to FIG. 10, rather than determining the brightness interval using only the value of the current input pixel (P24), the average value ($P_{AVG}$) of the pixels forming a 3×3 block centered at pixel P24 may be used (e.g., pixels P32, P31, P30, P25, P24, P23, P18, P17, and P16). Accordingly, the determination of the brightness interval and the corresponding upper and lower brightness levels may be based upon $P_{AVG}$ in such embodiments. As can be appreciated, the use of an averaged brightness (e.g., $P_{AVG}$) may be more robust to noise compared to using only the value of the current input pixel (e.g., P24).

In certain embodiments, the std_dev_inv values may be specified using 22 bits, with a 6-bit signed exponent (Exp) and a 16-bit mantissa (Mant) as shown below:

$$std\_dev\_inv = Mant * (2^{Exp});$$

wherein Exp has a range of $-32 <= Exp <= 31$ and wherein Mant has a range of $1.0 <= Mant < 2$. Collectively, this may allow a range of:

$$2^{-32} <= std\_dev\_inv < 2^{32}; \text{ or}$$
$$2^{-32} < std\_dev <= 2^{32};$$

Using the upper and lower brightness values from sub-block 262, upper and lower inverse noise standard deviation values corresponding to P may be selected from the std_dev_inv array and interpolated to obtain an inverse noise standard deviation (std_dev_inv) value for P. For instance, in one embodiment, this process may be performed as follows:

```
std_dev_inv0 = snf_dev_inv[c][x0];
std_dev_inv1 = snf_dev_inv[c][x1];
x_interval = x1_val - x0_val;
std_dev_inv = [((std_dev_inv0 * (x1_val-P)) +
               ((std_dev_inv1 * (P-x0_val))] /
               x_interval;
``` wherein std_dev_inv0 corresponds to the inverse noise standard deviation value of the lower brightness level, wherein std_dev_inv1 corresponds to the inverse noise standard deviation value of the upper brightness level, wherein x1_val and x0_val correspond to the brightness values of the upper and lower brightness levels, respectively, and wherein x_interval corresponds to the difference between the upper and lower brightness values. The value std_dev_inv represents the interpolation of std_dev_inv0 and std_dev_inv1.

Figure 13:
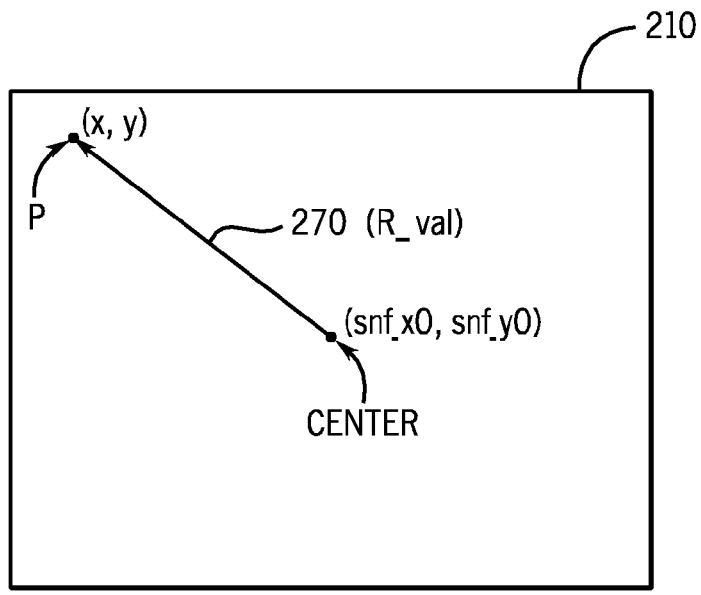
FIG. 13 is a graphical depiction showing the radial distance between a current input pixel and a center of a current image frame.

Thereafter, at sub-block 266, a radial gain is selected based upon the spatial location (e.g., radius) of the input pixel P relative to a center of the current image frame. For instance, referring to FIG. 13, a radial distance (R_val) 270 may be determined as the distance between a center point of an image frame (e.g., raw frame 210) having the coordinates (snf_x0, snf_y0) and the current input pixel P with the coordinates (x, y). In one embodiment, the radial distance or radius, R_val, may be determined as follows:

$$R\_val = \sqrt{((x-snf\_x0)^2 + (y-snf\_y0)^2)} \quad (1)$$

Figure 14:
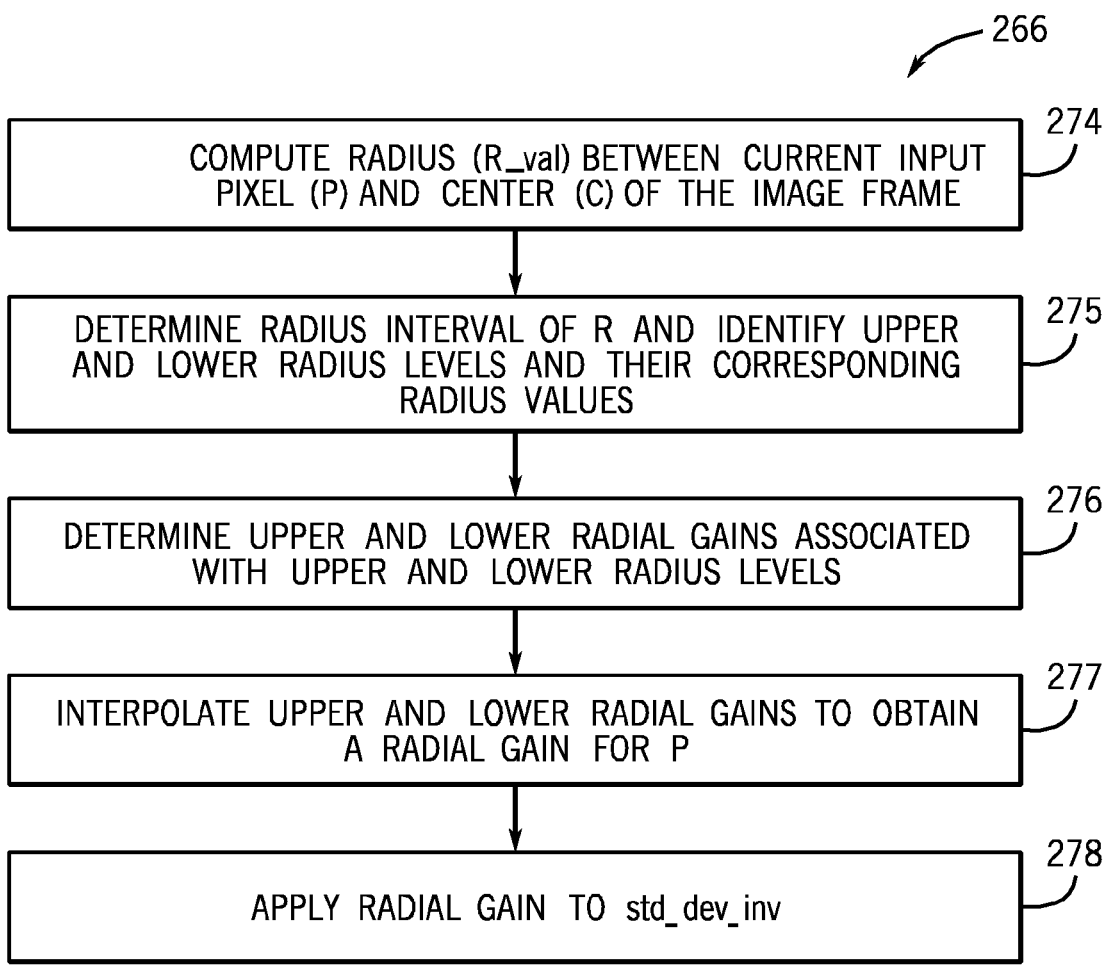
FIG. 14 is a flow chart depicting a process for determining and applying a radial gain to an inverse noise standard deviation value when performing the process for determining attenuation factors, as depicted in FIG. 12, in accordance with aspects of the present disclosure.

Once the R_val is determined, a sub-process corresponding to block 266, which is represented by blocks 274-278 of FIG. 14, may be performed to determine a radial gain to be applied to the inverse noise standard deviation value std_dev_inv determined at block 264 of FIG. 12.

As shown in FIG. 14, the blocks 274-278 of the sub-process 266 begins at sub-block 274, wherein a radius (R_val) from the center (C) of the image frame to the position of the current input pixel (P) is determined. In one embodiment, this determination may be based upon Equation 1, provided above. Next, at sub-block 275, the value of R_val may be evaluated against multiple radius intervals to identify an interval in which R_val is located. By way of example only, one embodiment may provide a total of 3 radius intervals, which may be defined by a first radius of 0 (e.g., located at the center (snf_x0, snf_y0) of the frame) and second, third, and fourth radius points. In one embodiment, the radius points, which may be defined by an array snf_rad[r]:($1 \leq r \leq 3$), may be used as exponential components to calculate a radius. For example, the first radius point, snf_rad[1], may define a radius equal to $2^{snf\_rad[1]}$. Thus, the first radius interval may have a range from 0 to $2^{snf\_rad[1]}$, the second radius interval may have a range from $2^{snf\_rad[1]}$ to $2^{snf\_rad[2]}$, and so forth.

Once a radius interval corresponding to R_val is identified, the upper radius point (R1) and lower radius point (R0) and their respective values may be determined, as shown at block 276. In one embodiment, this process may be performed as follows:

R0_val = 0 if(R0==center); else $2^{snf\_rad[R0]}$;
R1_val = $2^{snf\_rad[R1]}$;
R_interval = R1_val − R0_val;

wherein R0_val corresponds to radius value associated with the lower radius point, wherein R1_val corresponds to the radius value associated with the upper radius point, and wherein R_interval represents the difference between R1_val and R0_val.

While the above-discussed embodiment provides three radius intervals using the image frame center and three additional radius points, it should be appreciated that any suitable number of radius intervals may be provided in other embodiments using more or fewer radius points. Further, the above-discussed embodiment provides radius points that begin from the center of the image frame and progress outwards towards the edge/corners of the image frame. However, because the radius points are used as exponential components (e.g., $2^{snf\_rad[r]}$), the range of the radius intervals may increase exponentially as they get farther away from the image center. In some embodiments, this may result in larger radius intervals closer to the edges and corners of the image frame, which may reduce the resolution at which radius points and radial gains may be defined. In one embodiment, if greater resolution is desired at the edges/corners of the image, rather than defining radius intervals and radius points as beginning from the center of an image frame, radius intervals and radius points may be defined beginning from a maximum radius, $R_{max}$, and may progress inwards towards the center of the image frame. Thus, more radius intervals may be concentrated towards the edges of the image frame, thereby providing greater radial resolution and more radial gain parameters closer the edges. In a further embodiment, rather than using the radius points as exponential components for calculating radius intervals, multiple equally spaced intervals may be provided in higher concentration. For instance, in one embodiment, 32 radius intervals of equal ranges may be provided between the center of the image and a maximum radius ($R_{max}$). Further, in certain embodiments, radius points and their defined intervals may be stored in a look-up table.

Referring still to FIG. 14, the upper and lower radius points may then be used to determine upper and lower radial gains, as depicted by sub-block 276. As can be appreciated, the image frame may be subjected to intensity drop-offs that generally increase as the radial distance from center of the image frame increases. This may be due at least in part to the optical geometry of the lens (e.g., 88) of the image capture device 30. Accordingly, the radial gains may be set such that they generally increase for and the radius values farther away from the center. In one embodiment, the radial gains may have a range of from between approximately 0-4 and may be represented as 16-bit values with a 2-bit integer component and a 14-bit fraction component. In one embodiment, the radial gains may be defined by an array snf_rad_gain[g]: ($0 \leq g \leq 3$), wherein radial gains corresponding to the upper and lower points may be determined as follows:

G0 = snf_rad_gain[R0];
G1 = snf_rad_gain[R1];

Thereafter, at sub-block 277, the lower and upper radial gains, G0 and G1, may be interpolated using the below expression to determine an interpolated radial gain (G):

G = [((G0 * (R1_val − R_val)) + ((G1 * (R_val − R0_val))] / R_interval;

The interpolated radial gain G may then be applied to inverse noise standard deviation value (std_dev_inv determined from block 264 of FIG. 12), as shown at sub-block 278, which may produce a gained inverse noise standard deviation value, referred to herein as std_dev_inv_gained. As will be appreciated, in certain embodiments, the radial gain values may be stored using a look-up table.

Then, returning to FIG. 12 and continuing to sub-block 268, an attenuation function is used to determine an attenuation factor. In some embodiments, the attenuation function may be based upon a Gaussian function. For instance, since sensor noise (photon noise) is multiplicative, the variance of the noise increases with brightness. Accordingly, the attenuation function may depend on the brightness of the current input pixel, which is represented here by std_dev_inv_gained. Thus, the attenuation factor that is to be applied to the filter coefficient of the current neighbor pixel may be calculated using the gained inverse noise standard deviation value (std_dev_inv_gained) and the absolute difference (Δ) between the current pixel P and the current neighbor pixel. For instance, in one embodiment, the attenuation factor (Attn) at each filter tap may be determined using the following equation:

$$Attn = e^{(-0.5(delta^2 \times std\_dev\_inv\_gained^2))} \quad (2)$$

wherein delta represents the pixel difference between the current input pixel (P) and each neighbor pixel. For the current input pixel P at the center, the attenuation factor may be set to 1 (e.g., no attenuation is applied at the center tap of the 7×7 block).

As shown in the present embodiment, the attenuation factors for all taps of the SNF 194 may be determined using the same gained standard deviation inverse value for all filter taps (e.g., std_dev_inv_gained), which is based on the radial distance between the center pixel and the center of the image frame. In further embodiments, separate respective standard deviation inverse values could also be determined for each filter taps. For instance, for each neighboring pixel, a radial distance between the neighboring pixel and the center of the image frame may be determined and, using the radial distance between the neighboring pixel and the center of the image frame (instead of the radial distance between the center pixel and the center of the image frame), a radial gain may be selected and applied to the standard deviation inverse value determined at block 264 of FIG. 12 to determine a unique gained standard deviation inverse value for each filter tap.

As will be appreciated, the determination of an attenuation factor (Attn) may be performed for each filter tap of the SNF 194 to obtain an attenuation factor, which may be applied to each filtering coefficient. Thus, assuming a 7×7 filter is used, as a result of block 268, 49 attenuation factors may be determined, one for each filter tap of the 7×7 SNF filter 194. Referring back to FIG. 11, particularly to block 254 of the process 244, the attenuation factors from block 252 (as determined by sub-block 268 of FIG. 12) may be applied to each filter tap of the SNF filter 194 to obtain a resulting set of attenuated filtering coefficients.

As discussed above, each attenuated filtering coefficient is then applied to its respective pixel within the 7×7 block on which the SNF filter 194 operates, as shown by block 256 of process 244. For normalization purposes, a sum (tap_sum) of all the attenuated filtering coefficients as well as a pixel sum (pix_sum) of all the filtered pixel values may be determined. For instance, at block 258, a spatially filtered output value O(j, i) that corresponds to the input pixel P(j, i) may be determined by dividing the sum of the filtered pixels (pix_sum) by the sum of the attenuated filter coefficients (tap_sum). Thus, the process 244 illustrated in FIG. 11 provides an embodiment which details how spatial noise filtering may be applied to one input pixel. As will be appreciated, to apply spatial noise filtering to an entire raw frame of pixel data, the process 244 may be repeated for each pixel within a current raw frame using the spatial filtering techniques discussed above.

In a further embodiment, the determination of attenuation factors for the SNF 194 filter taps may be performed using values obtained from a set look-up tables with interpolation of table values. For instance, in one embodiment, attenuation values may be stored in a three-dimensional look-up table, referred to herein as snf_attn[c][x][delta], wherein [c] represents a color component index having a range of 0-3 (e.g., representing the four color components of Bayer raw data), x represents a pixel brightness index having a range of 0-4, and delta represents a pixel difference index having a range of 0-32. In such an embodiment, the table snf_attn may store attenuation values having a range from 0.0 to 1.0, with a 14-bit fraction. An array snf_attn_max[c][x] may define a maximum pixel difference per color component (0-3) for each pixel brightness (x). In one embodiment, when pixel differences are greater than 2^snf_attn_max, the attenuation factor may be set to 0.

The snf_attn table may store attenuation factors that cover the pixel difference range from 0 to 2^[(snf_bright_thd)−1], where snf_bright_thd[c][thd] defines pixel brightness level thresholds (thd=0-2) per component (c=0-3), with thresholds being represented as 2^snf_bright_thd[c][i]. As can be appreciated, this may represent the pixel thresholds for the snf_attn pixel brightness index. For example, the first threshold may be equal to 0, and the last threshold may be equal to 2^14−1, thus defining 4 intervals. The attenuation factors for each filter tap may be obtained by linear interpolation from the closest pixel brightness (x) and pixel differences values (delta).

Figure 15:
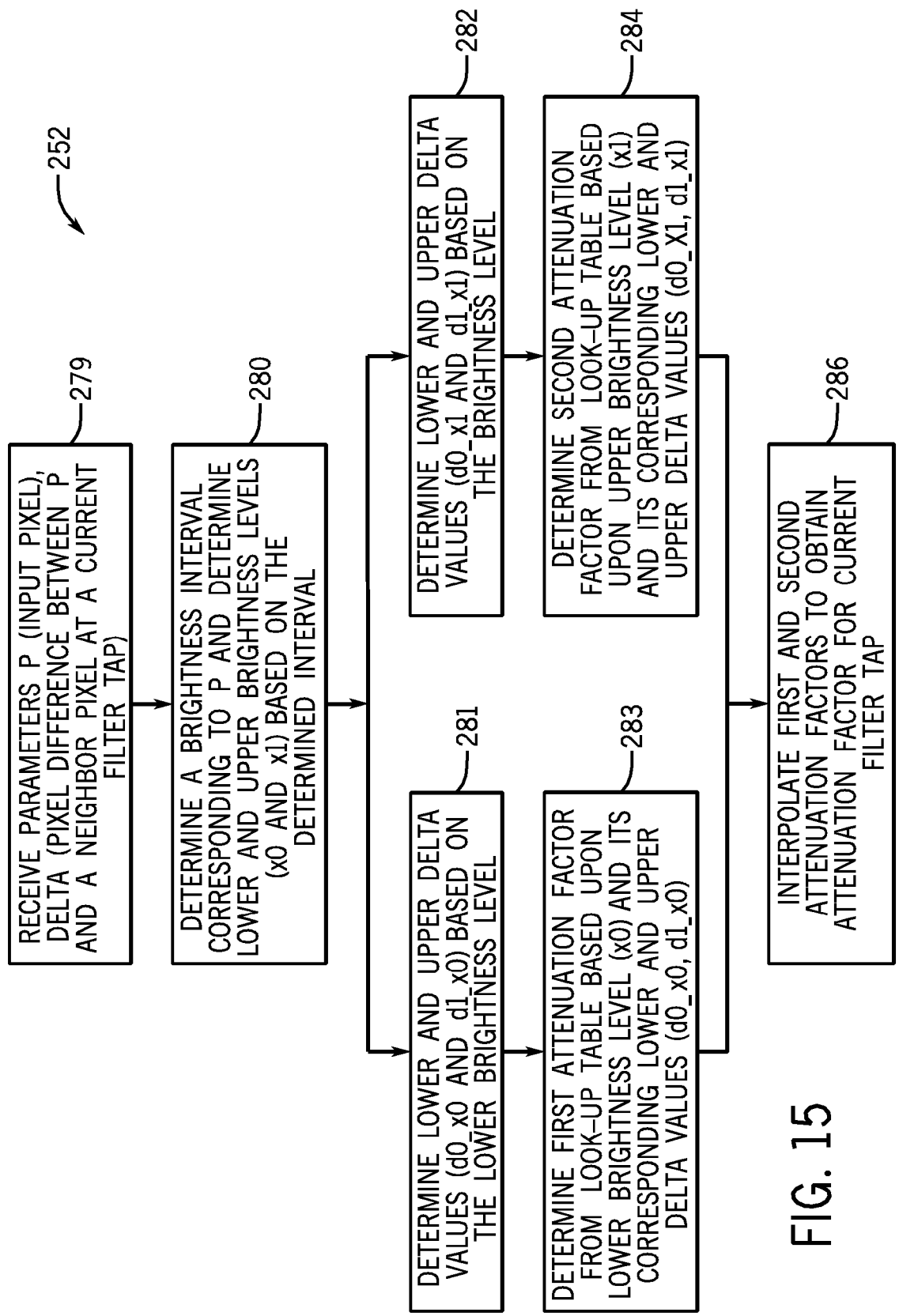
FIG. 15 is a flow chart depicting a process for determining attenuation factors when performing the spatial noise filtering process depicted in FIG. 11, in accordance with another embodiment of the present disclosure.

Referring now to FIG. 15, a flow chart showing another embodiment of sub-process 252 is illustrated in accordance with the above-described embodiment. The sub-process 252 illustrated in FIG. 15 includes sub-blocks 279-286, and depicts a process for using a look-up table based approach for interpolating attenuation values to obtain an attenuation values for a current filter tap. As shown the sub-process 252 of FIG. 15 begins at sub-block 279, where parameters corresponding to the value of the current input pixel (P) and the pixel difference (delta) between P and the neighbor pixel corresponding to the current filter tap. As discussed above, in one embodiment, rather than providing just the value of the current input pixel, the brightness value P could also be provided as an average of brightness values of the pixels in a 3×3 pixel block centered at the current input pixel.

Next, at sub-block 280, a brightness interval corresponding to P is determined. For instance, the value of P may be evaluated against multiple brightness intervals to identify an interval in which the value P lies, and to determine lower and upper brightness levels (x0 and x1) that define the selected interval. In one embodiment, the process at sub-block 280 may be determined using the following logic:

```
for (i=0; i<3; i++)
{
    if (p < snf_bright_thd[c][i])
    {
        x0 = i;      //determine lower brightness level
        x1 = i+1;    //determine upper brightness level
    }
}
```

Next, the sub-process 252 continues to sub-blocks 281 and 282. At these sub-blocks, lower and upper pixel difference levels based each of the lower and upper brightness levels (x0 and x1) are determined. For instance, at sub-block 281, lower and upper pixel difference levels (d0_x0 and d1_x0) corresponding to the lower brightness level (x0) are determined, and at sub-block 282, lower and upper pixel difference levels (d0_x1 and d1_x1) corresponding to the upper brightness level (x0) are determined. In one embodiment, the processes at sub-blocks 281 and 282 may be determined using the following logic:

```
interval_x0  = (2^snf_attn_max[comp][x0]/32);  //size of interval
interval_x1  = (2^snf_attn_max[comp][x1]/32);  //size of interval
shift_x0     = snf_attn_max[comp][x0]-5;        //log2(interval)
shift_x1     = snf_attn_max[comp][x1]-5;        //log2(interval)
//lower and upper deltas for x0
```

-continued

```
    for (i=0; i<33; i++)
    {
        if(delta < (i+1)*interval_x0)
        {
            d0_x0 = i;
            d1_x0 = i+1;
        }
    }
    //lower and upper delta for x1
    for (i=0; i<33; i++)
    {
        if (delta < (i+1)*interval_x1)
        {
            d0_x1 = i;
            d1_x1 = i+1;
        }
    }
```

Thereafter, sub-block 281 may continue to sub-block 283, and sub-block 282 may continue to sub-block 284. As shown in FIG. 15, at sub-blocks 282 and 284, first and second attenuation factors corresponding to the upper and lower brightness levels, respectively, may be determined using the table snf_attn and the delta levels determined at sub-blocks 281 and 282. For instance, in one embodiment, the determination of the first and second attenuation factors (attn0 and attn1) at sub-blocks 283 and 284 may be performed using the following logic:

```
//attn (first attenuation factor) corresponding to x0
attn0 =  (snf_attn[c][x0][d0_x0] * (d1_x0*interval_x0 – delta) +
         snf_attn[c][x0][d1_x0] * (delta – d0_x0*interval_x0))
         >> shift_x0;
//attn (first attenuation factor) corresponding to x1
attn1 =  (snf_attn[c][x1][d0_x1] * (d1_x1*interval_x1 – delta) +
         snf_attn[c][x1][d1_x1] * (delta – d0_x1*interval_x1))
         >> shift_x1;
```

Thereafter, the first and second attenuation factors may be interpolated, as shown at sub-block 286, to obtain a final attenuation factor (attn) that may be applied to the current filter tap. In one embodiment, the interpolation of the first and second attenuation factor may be accomplished using the following logic:

```
x0_value = 2^snf_bright_thd[c][x0];
x1_value = 2^snf_bright_thd[c][x1];
x_interval = x1_value – x0_value;
attn =  (((attn0 * (x1_value – P))+((attn1 * (P – x0_value))) /
        x_interval;
```

The sub-process 252 may be repeated for each filter tap to obtain a corresponding attenuation factor. Once the attenuation factors for each filter tap have been determined, the sub-process 252 may return to block 264 of the process 244 shown in FIG. 11, and the process 244 may continue, as described above. As will be appreciated, the look-up table snf_attn may be programmed such that its attenuation values are modeled based upon a Gaussian distribution (e.g., a function similar to Equation 2 above). Further, while snf_attn is described as providing a range of attenuation values ranging from 0.0 to 1.0, in other embodiments, snf_attn may also provide values greater than 1.0 (e.g. from 0.0 to 4.0). Thus, if a factor greater than 1 is selected, this may implement image sharpening, where larger pixel differences (deltas) are amplified and/or increased.

The processes discussed above with respect to FIGS. 10-15 have been described in the context of a bilateral filtering mode that may be implemented by the SNF filter 194 shown in FIG. 8. As mentioned above, in certain embodiments, the SNF 194 may also be configured to operate in a non-local means filtering mode. The non-local means filtering mode may be performed in a similar manner as with the bilateral filtering mode, except that an absolute difference value between the current input pixel P(j, i) and each neighbor pixel within the 7×7 block (FIG. 10) is determined by taking the sum of absolute differences of a 3×3 window centered around the current pixel against a 3×3 window centered around each neighbor pixel, and then normalizing the result by the number of pixels (e.g., 9 pixels when a 3×3 window is used).

Figure 16:
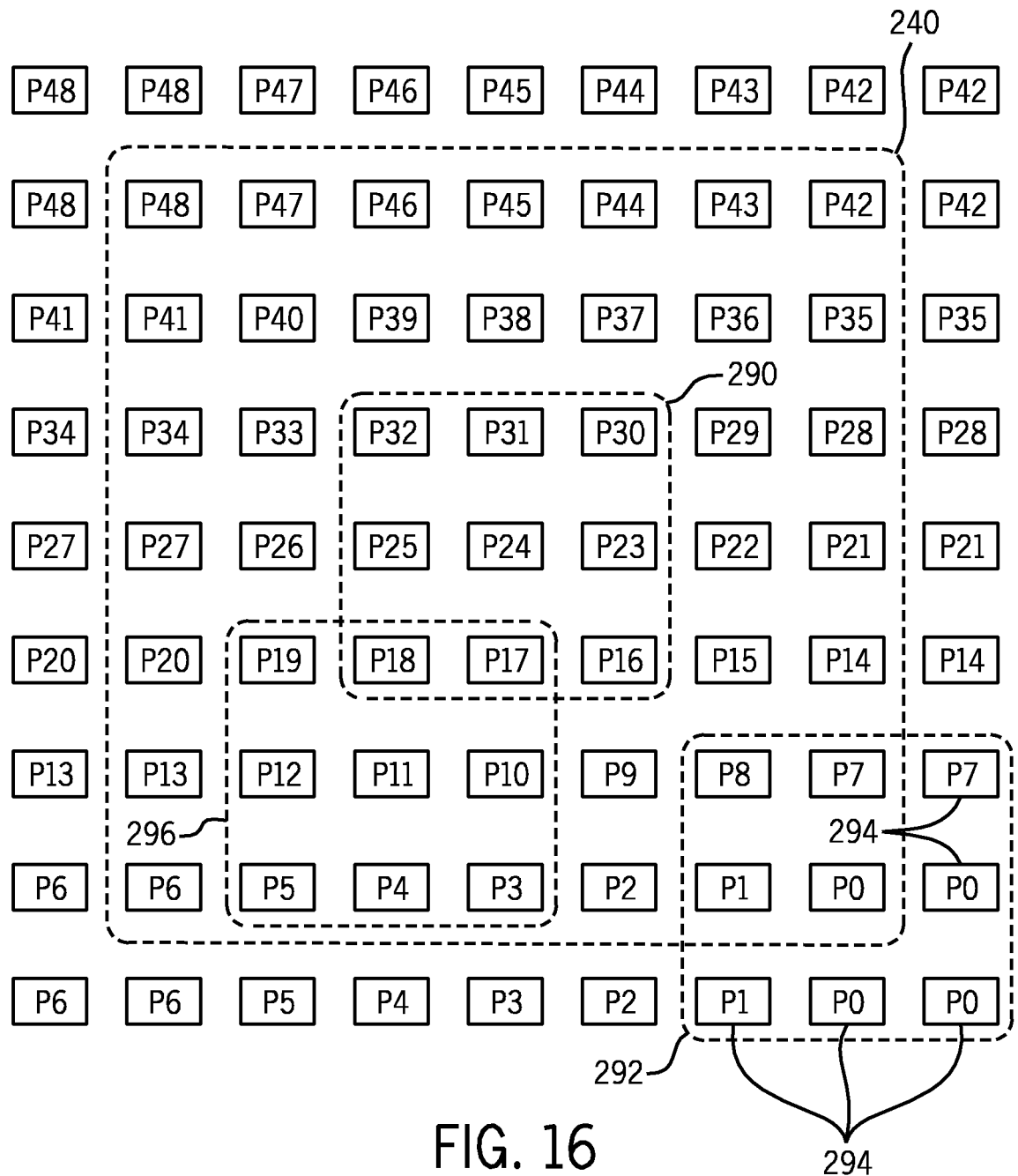
FIG. 16 shows an embodiment in which pixel differences for spatial noise filtering are determined using a non-local means technique in accordance with aspects of the present disclosure.

FIG. 16 shows an example of how pixel absolute difference values may be determined when the SNF filter 194 operates in a non-local means mode in applying spatial noise filtering to the 7×7 block of pixels 240 (originally depicted in FIG. 10). When determining an absolute pixel difference between the input pixel P24 and P0, a 3×3 window 290 of pixels centered about P24 is compared to a 3×3 window 292 of pixels centered about P0. Since P0 is located at the edge of the 7×7 block 240, the 3×3 window is obtained by replicating edge pixels P7, P0, and P1. The replicated pixels are depicted here by reference number 294.

The absolute difference value is then calculated by obtaining a sum of the absolute differences between each corresponding pixel in the windows 290 and 292, and normalizing the result by the total number of pixels in a window. For instance, when determining the absolute difference value between P24 and P0 in the non-local means mode, the absolute differences between each of P32 and P8, P31 and P7, P30 and P7, P25 and P1, P24 and P0, P23 and P0, P18 and P1, P17 and P0, and P16 and P0 are summed to obtain a total absolute difference between the windows 290 and 292. The total absolute difference value is then normalized by the number of pixels in a window, which may be done here by dividing the total absolute difference value by 9. Similarly, when determining the absolute difference value between P24 and P11, the 3×3 window 290 and the 3×3 window 296 (centered about P11) are compared, and the absolute difference between each of P32 and P19, P31 and P18, P30 and P17, P25 and P12, P24 and P11, P23 and P10, P18 and P5, P17 and P6, and P16 and P7 are summed to determine a total absolute difference between the windows 290 and 296, and then divided by 9 to obtain a normalized absolute difference value between P24 and P11. As can be appreciated, this process may then be repeated for each neighbor pixel within the 7×7 block 240 by comparing the 3×3 window 290 with 3×3 windows centered about every other neighbor pixel within the 7×7 block 240, with edge pixels being replicated for neighbor pixels located at the edges of the 7×7 block.

The absolute pixel difference values calculated using this non-local means mode technique may similarly be used in the process 244 of FIG. 11 to determine attenuation factors and radial gains for applying spatial noise filtering to the input pixel (e.g. P24). In other words, the non-local means mode of filtering is generally similar to the bilateral mode discussed above, with the exception that the pixel differences are calculated by comparing summed and normalized pixel differences using 3×3 windows centered around a neighbor pixel and the input pixel within the 7×7 block 240 rather than simply taking the absolute difference between a single neighbor pixel and the input pixel. Additionally, the use of a 3×3 window in the present embodiment is only intended to provide one example of a non-local means filtering technique, and should not be construed as being limiting in this regard.

Indeed, other embodiments, may utilize 5×5 windows within the 7×7 block, or 5×5 or 7×7 windows within a larger pixel block (e.g., 11×11 pixels, 13×13 pixels, etc.), for example.

In some embodiments, the selection of either the bilateral or non-local means filtering mode by the SNF 194 may be determined by one or more parameters set by the control logic 86, such as by toggling a variable in software or by a value written to a hardware control register. The use of the non-local means filtering mode may offer some advantages in certain image conditions. For instance, the non-local means filtering made may exhibit increased robustness over the bilateral filtering mode by improving de-noising in flat fields while preserving edges. This may improve overall image sharpness. However, as shown above, the non-local means filtering mode may require that the SNF 194 perform significantly more computations, including at least 10 additional processing steps for comparing each neighbor pixel to the current input pixel, including 8 additional pixel difference calculations for each 3×3 window (for each of the eight pixels surrounding the input pixel and the neighbor pixel), a calculation to determine the sum of the pixel absolute differences, and a calculation to normalize the pixel absolute difference total. Thus, for 48 neighbor pixels, this may result in at least 480 (48*10) processing steps. Thus, in instances where processing cycles, power, and/or resources are limited, the SNF 194 may be configured to operate in the bilateral mode.

Figure 17:
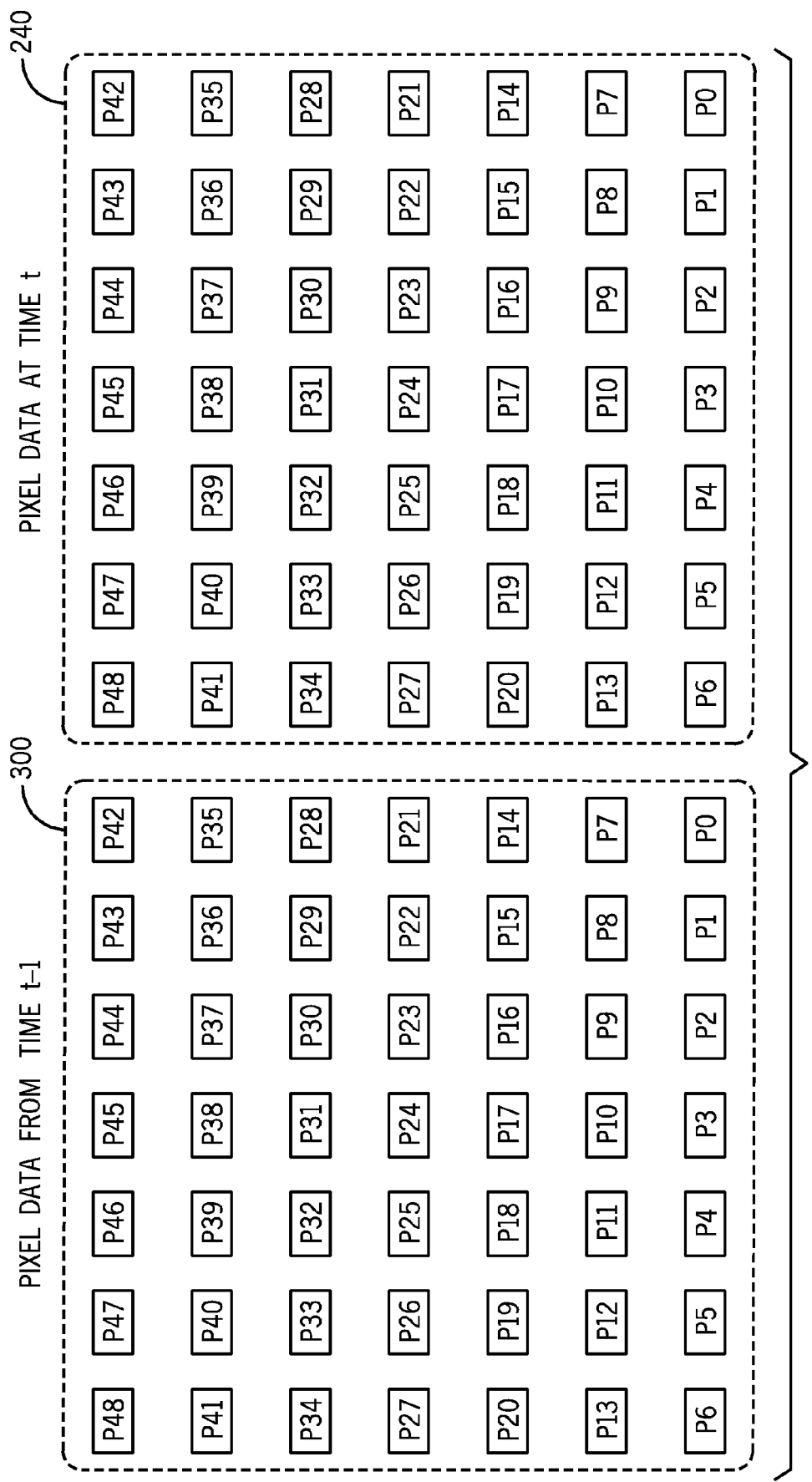
FIG. 17 graphically depicts two sets of pixels from two different times that may be operated upon by the spatial noise filter of FIG. 8 to perform a three-dimensional spatial noise filtering process in accordance with aspects of the present disclosure.

In the above-discussed embodiments, the SNF 194 was described as operating as a two-dimensional filter. In a further embodiment, the SNF 194 may also be configured to operate in a three-dimensional mode, which is illustrated in FIG. 17. In the three-dimensional mode, spatial noise filtering may be performed by further applying the spatial filtering process 244 (FIG. 11) in the temporal direction. For instance, three-dimensional spatial filtering may include using a 7×7 block 240 of neighbor pixels of a current frame of image data (at time t) to apply spatial filtering to a current input pixel (P24$_t$) to obtain a first spatially filtered output value corresponding to the current input pixel. Spatial filtering may also be applied to the current input pixel (P24$_t$) using co-located neighbor pixels from a 7×7 block 300 in a previous frame of image data (at time t-1) to obtain a second spatially filtered output value corresponding to the current input pixel. The first and second spatially filtered values may be combined using weighted averaging to obtain a final spatially filtered output value corresponding to the current input pixel. As will be appreciated, three-dimensional spatial noise filtering may be performed using either the bilateral mode or the non-local means mode discussed above.

Figure 18:
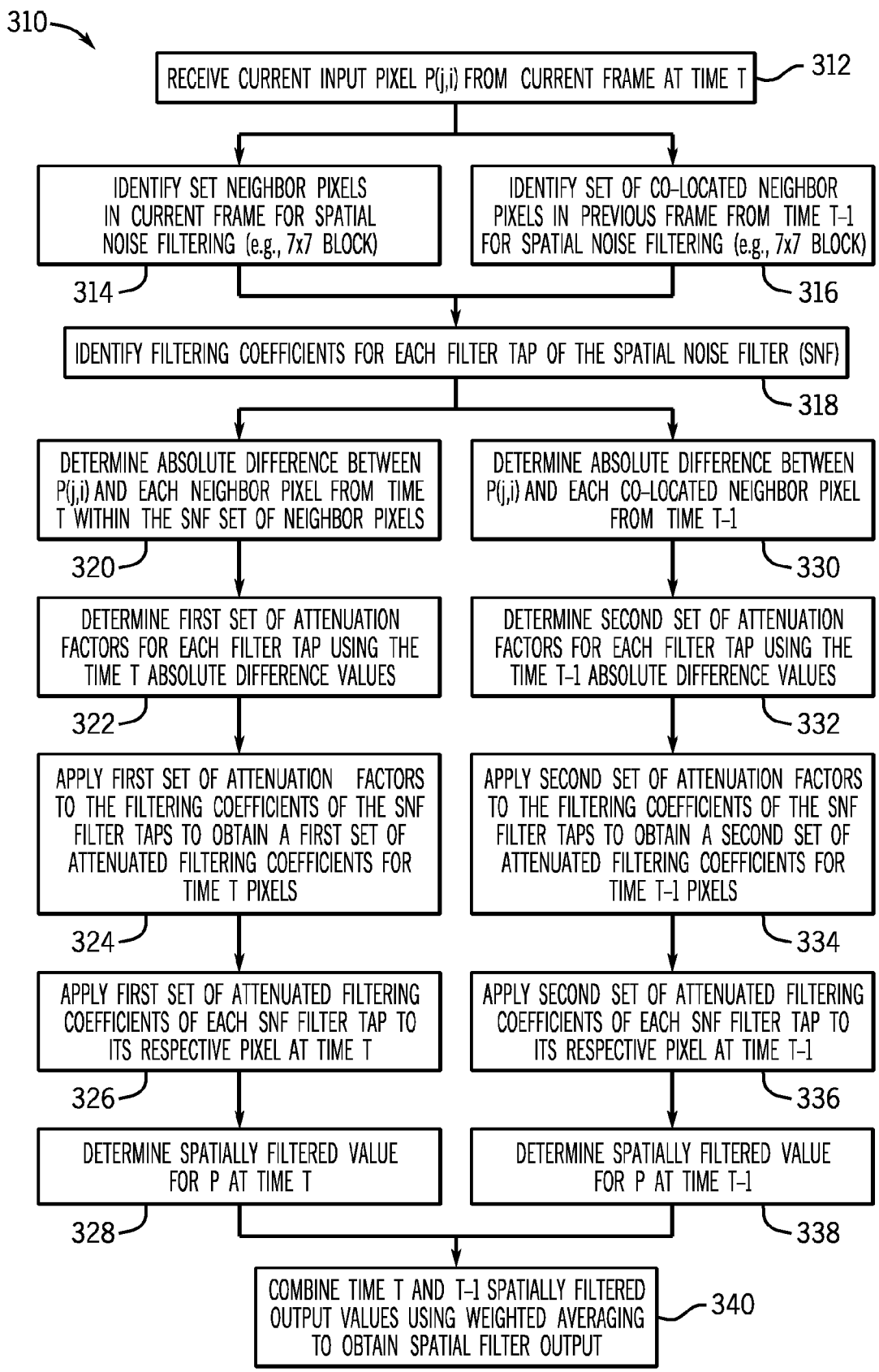
FIG. 18 is a flow chart depicting a process for applying a three-dimensional spatial noise filtering process in accordance with aspects of the present disclosure.

A process 310 depicting an embodiment for three-dimensional spatial noise filtering is depicted in more detail in FIG. 18. For instance, the process 310 begins at block 312 and receives a current input pixel P from a current from at time t. Referring concurrently to FIG. 17, the current pixel P may correspond to P24$_t$ from the 7×7 block 240. Next, at block 314, a set of neighbor pixels in the current frame (time t) on which the SNF 194 may operate is identified. This set of neighbor pixels may be represented by the 7×7 block 240 from time t, as shown in FIG. 17. Additionally, at block 316, which may occur concurrently with block 314, a set of neighbor pixels in a previous frame from time t-1, which are co-located with the pixels of the 7×7 block 240 at time t, are identified. This set of co-located neighbor pixels may be represented by the 7×7 block 300 from time t-1, as shown in FIG. 17.

Next, at block 318, filtering coefficients for each filter tap of the SNF 194 are determined. In the depicted embodiment, the same filtering coefficients may be applied to the pixel data from time t and from time t-1. However, as discussed below, the attenuation factors applied to the filtering coefficients may vary between the pixels at time t and at time t-1 depending on differences in the absolute difference values between the input pixel (P24$_t$) and the neighbor pixels of the current frame (at time t) and the neighbor pixels of the previous frame (at time t-1). Referring now to blocks 320-328, these blocks generally represent the process 244 discussed above in FIG. 11. For instance, at block 320, absolute difference values between the current input pixel P at time t and the neighbor pixel within the 7×7 block 240 of time t are determined. As will be appreciated, the absolute difference values may be determined using either of the bilateral or non-local means techniques described above. Using the absolute difference values from block 320, a first set of attenuation factors corresponding to the pixels at time t are determined at block 322. At block 324, the first set of attenuation factors may then be applied to the filtering coefficients of the SNF 194 to obtain a first set of attenuated filtering coefficients for the pixels at time t. Then, the first set of attenuated filtering coefficients is applied to the pixels from time t within the 7×7 block 240, as indicated by block 326. Thereafter, a spatially filtered value for the input pixel P based on the neighbor pixel values at time t is determined at block 328. For example, as discussed above, obtaining the spatially filtered value may include normalizing the sum of the filtered pixels from block 326 by the sum of the first set of attenuated filter coefficients determined at block 324.

Blocks 330-338 may occur generally concurrently with blocks 320-328, and represent the spatial filtering process 244 of FIG. 11 being applied to the input pixel P using the co-located neighbor pixels (e.g., within the 7×7 block 300) from time t-1. That is, the spatial filtering process is essentially repeated in blocks 330-338 for the current input pixel P, but with respect to the neighbor pixels from time t-1 instead of the current pixels from time t. For example, at block 330, absolute difference values between the current input pixel P at time t and the neighbor pixel within the 7×7 block 300 of time t-1 are determined. Using the absolute difference values from block 330, a second set of attenuation factors corresponding to the pixels at time t-1 are determined at block 332. At block 334, the second set of attenuation factors may then be applied to the filtering coefficients of the SNF 194 to obtain a second set of attenuated filtering coefficients for the pixels at time t-1. Subsequently, the second set of attenuated filtering coefficients is applied to the pixels from time t-1 within the 7×7 block 300, as indicated by block 336. Thereafter, a spatially filtered value for the input pixel P based on the neighbor pixel values at time t-1 is determined at block 338.

Once the spatially filtered values for P at time t and time t-1 are determined, they may be combined using weighted averaging, as depicted by block 340. For instance, in one embodiment, the output of the SNF 194 may simply be determined as the mean of the spatially filtered values at time t and time t-1 (e.g., equal weighting). In other embodiments, the current frame (time t) may be weighted more heavily. For instance, the output of the SNF 194 may be determined as being 80 percent of the spatially filtered value from time t and 20 percent of the spatially filtered value from time t-1, or 60 percent of the spatially filtered value from time t and 40 percent of the spatially filtered value from time t-1, and so forth. In a further embodiments, three-dimensional spatial filtering may also utilize more than one previous frame. For instance, in the SNF 194 could also apply the spatial filtering processing using the current pixel P with respect to co-located neighbor pixels from the frame at time t-1, as well as one or more additional previous image frames (e.g., at time t-2, time t-3, etc.). In such embodiments, weighted averaging may thus be performed on three or more spatially filtered values corresponding to different times. For instance, by way of example only, in one embodiment where the SNF 194 operates on a current frame (time t) and two previous frames (time t-1 and time t-2), the weighting may be such that the spatially filtered value from time t is weighted 60 percent, the spatially filtered value from time t-1 is weighted 30 percent, and the spatially filtered value from time t-2 is weighted 10 percent.

In another embodiment, rather than simply averaging the spatially filtered values corresponding to times t and t-1, normalization may be performed on all filter taps from the current and previous image data. For instance, in an embodiment where a 7×7 block of pixels is evaluated at times t and t-1 (e.g., 49 taps at time t and 49 taps at time t-1 for a total of 98 taps), attenuation may be applied to all of the taps and the resulting filtered pixel values at both times t and t-1 may be summed and normalized by dividing the sum by the sum of the attenuated filter coefficients at both times t and t-1. As will be appreciated, in some embodiments, this technique may offer improved accuracy compared to techniques that use either an equal or weighted average by excluding pixel-to-pixel variations. Additionally, this technique may be useful in implementations where it is difficult to select an appropriate/ideal weighting parameter.

Additionally, it should be noted that the pixels from time t-1 may be selected as either the original (e.g., non-filtered) pixels of the previous frame, in which case the SNF 194 operates as a non-recursive filter, or as the filtered pixels of the previous frame, in which case the SNF 194 operates as a recursive filter. In one embodiment, the SNF 194 may be capable of operating in both recursive and non-recursive modes, with the selection of the filtering mode being determined by control logic 86.

In some embodiments, the SNF 194 may be initialized using a calibration procedure. In one embodiment, the calibration of the SNF 194 may be based upon measured noise levels in the image sensor at different light levels. For instance, noise variance, which may be measured as part of the calibration of the image capture device(s) 30 (e.g., a camera) may be used by the control logic 86 (e.g., firmware) to determine spatial noise filter coefficients, as well as standard deviation values for spatial noise filtering.

Having described the operation and various processing techniques associated with the spatial noise filter 194 of the front-end pixel processing unit 150, the present discussion will now return to FIG. 8. As depicted in FIG. 8, the output of the SNF 194 is then provided to the binning compensation filter (BCF) 196. In some embodiments, the image sensor 90 may be configured to apply binning to full resolution image data in order to increase signal-to-noise ratio of the image signal. For instance, a binning technique, such as 2×2 binning, may be applied which may interpolate a "binned" raw image pixel based upon four full-resolution image pixels of the same color. In one embodiment, this may result in there being four accumulated signal components associated with the binned pixel versus a single noise component, thus improving signal-to-noise of the image data, but reducing overall resolution. Additionally, binning may also result in an uneven or non-uniform spatial sampling of the image data, which may be corrected using binning compensation filtering. Thus, the BCF 196 may be configured to apply scaling and/or re-sampling on binned raw image data from an image sensor (e.g., 90a, 90b) to maintain an even spatial distribution of the image pixels. By way of example only, the binning compensation filter 196 depicted in the ISP front-end pixel processing unit 150 of FIG. 8 may be configured to implement one or more of the binning compensation filtering techniques disclosed in U.S. patent application Ser. No. 12/846,008 entitled "Binning Compensation Filtering Techniques for Image Signal Processing," which was filed on Jul. 29, 2010 and assigned to the assignee of the present disclosure, the entirety of which is incorporated herein by reference. The output of the BCF 196 may produce the output signal FEProcOut, which may then be forwarded to the ISP pipeline 82 for further processing, as discussed below.

Figure 19:
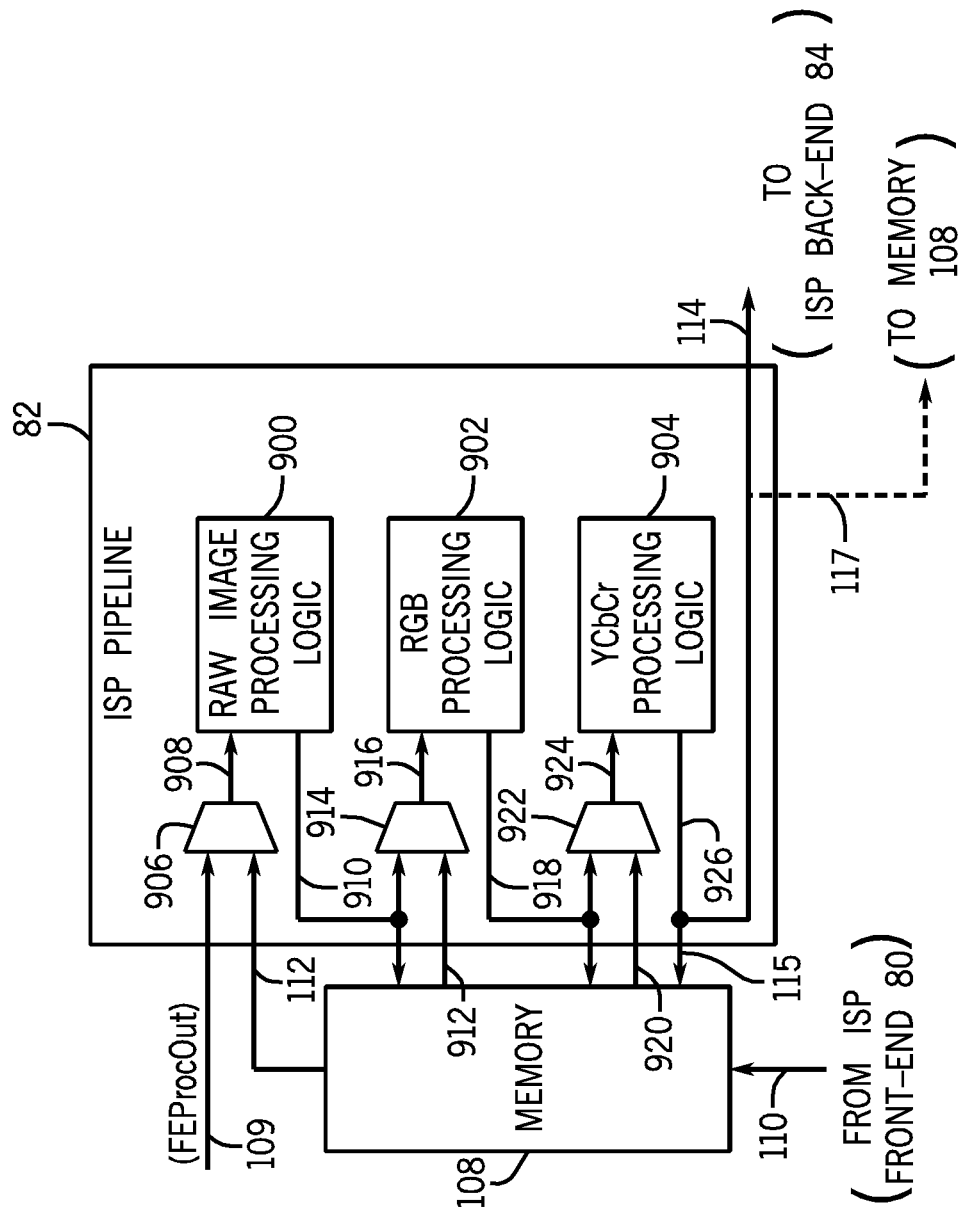
FIG. 19 is a block diagram showing an embodiment of an ISP pipeline that may be implemented in the ISP sub-system of FIG. 6 in accordance with aspects of the present disclosure.

Referring to FIG. 19, a block diagram showing an embodiment of the ISP pipeline 82 of FIG. 6 is illustrated. As shown, the ISP pipeline 82 may include raw processing logic 900, RGB processing logic 902, and YCbCr processing logic 904. As discussed above, certain embodiments, the ISP pipeline 82 may be implemented in accordance with embodiments disclosed in the above-referenced co-pending U.S. patent application Ser. No. 12/789,815.

In one embodiment, the raw processing logic 900 may perform various image processing operations, which may include a demosaicing operation to convert the raw pixel data (e.g., Bayer data) into full color image data in an RGB color space. Prior to demosaicing, additional processing operations may be performed, which may include defective pixel detection and correction (e.g., may be implemented in an identical manner as the DPC block 192 of FIG. 8), lens shading correction, as well as applying gains for auto-white balance and/or setting a black level. By way of example only, lens shading correction may be implemented in accordance with techniques disclosed in U.S. patent application Ser. No. 12/582,377 entitled "System and Method for Applying Lens Shading Correction During Image Processing," which was filed on Oct. 20, 2009 and assigned to the assignee of the present disclosure, the entirety of which is incorporated herein by reference. Further, in one embodiment, the raw processing logic 900 may be configured to implement demosaicing of the raw image data in accordance with techniques disclosed in U.S. patent application Ser. No. 12/582,414 entitled "System and Method for Demosaicing Image Data Using Weighted Gradients," which was also filed on Oct. 20, 2009 and assigned to the assignee of the present disclosure, the entirety of which is incorporated herein by reference.

As shown in the present embodiment, the input signal 908 to the raw processing logic 900 may be the raw pixel output 109 (signal FEProcOut) from the ISP front-end logic 80 or the raw pixel data 112 from the memory 108, depending on the present configuration of the selection logic 906. As a result of demosaicing operations performed by the raw processing logic 900, the image signal output 910 may be in the RGB domain, and may be subsequently forwarded to the RGB processing logic 902. For instance, as shown in FIG. 19, the RGB processing logic 902 receives the signal 916, which may be the output signal 910 or an RGB image signal 912 from the memory 108, depending on the present configuration of the selection logic 914.

The RGB processing logic 902 may provide for various RGB color adjustment operations, including color correction (e.g., using a color correction matrix), the application of color gains for auto-white balancing, as well as global tone mapping. The RGB processing logic 904 may also provide for the color space conversion of RGB image data to the YCbCr (luma/chroma) color space. Thus, the image signal output 918 may be in the YCbCr domain, and may be subsequently forwarded to the YCbCr processing logic 904. For instance, as shown in FIG. 19, the YCbCr processing logic 904 receives the signal 924, which may be the output signal 918 from the RGB processing logic 902 or a YCbCr signal 920 from the memory 108, depending on the present configuration of the selection logic 922. In certain embodiments, the YCbCr processing logic 904 may provide for image processing operations in the YCbCr color space, including scaling, chroma suppression, luma sharpening, brightness, contrast, and color (BCC) adjustments, YCbCr gamma mapping, chroma decimation, and so forth. By way of example only, some embodiments of the YCbCr processing logic 904 may be configured to implement luma sharpening in accordance with techniques disclosed in U.S. patent application Ser. No. 12/582,390 entitled "System and Method for Sharpening Image Data," which was filed on Oct. 20, 2009 and assigned to the assignee of the present disclosure, the entirety of which is incorporated herein by reference.

The image signal output 926 of the YCbCr processing logic 904 may be sent to the memory 108, or may be output from the ISP pipeline 82 as the image signal 114 (FIG. 6) and provided either to memory 108 or to the ISP back-end processing logic 84 for additional processing. As discussed above, the ISP back-end logic 84, which may be implemented using one or more aspects of the above-referenced co-pending U.S. patent application Ser. No. 12/894,833, may provide for local tone mapping, brightness, contrast, and color adjustments, as well as scaling logic for scaling the image data to one or more desired resolutions (e.g., based upon a resolution of an output display device). Further, the ISP back-end logic 84 may also provide for feature detection (e.g., face detection), which may be utilized by front-end statistics and back-end statistics during image processing. Referring back to FIG. 6, the output of the back-end processing logic 84 may be sent as image signal 126 to the display device 28 (either directly or via memory 108 as signal 116) for viewing by the user, or may be further processed using a compression engine (e.g., encoder/decoder 118), a CPU/GPU, a graphics engine, or the like, as shown by signal 117.

While the spatial noise filtering techniques have been described above as being applied to raw image data, it should be appreciated that these spatial noise filtering techniques may also be applied to image data in other color spaces, including those in which the ISP pipeline 82 operates. For instance, in some embodiments, spatial noise filtering may also be applied to image data in an RGB color space, a YCbCr color space, as well as color spaces that may be better correlated to perceived noise in the human visual system (HVS), such as a Lab (e.g., Lab CIE) color space.

As will be understood, the various image processing techniques described above, particularly those related to spatial noise filtering, are provided herein by way of example only. Accordingly, it should be understood that the present disclosure should not be construed as being limited to only the examples provided above. Indeed, the exemplary logic depicted herein may be subject to a number of variations and/or additional features in other embodiments. Further, it should be appreciated that the above-discussed techniques may be implemented in any suitable manner. For instance, the various components of the image signal processing sub-system 32 may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising
receiving an image frame comprising raw pixels, wherein the image frame is acquired using an image sensor, and wherein the raw pixels comprise multi-color raw pixel data;
applying spatial noise filtering to each raw pixel of the image frame using a spatial noise filter, wherein applying spatial noise filtering comprises:
identifying a first set of pixels from the image frame, the set of pixels comprising a current input pixel and a plurality of same-colored neighboring pixels, wherein the current input pixel has a first spatial location within the image frame and a pixel value, and wherein the neighboring pixels are spatially located about the current input pixel;
identifying a set of filtering coefficients for each filter tap of the spatial noise filter, wherein the set of filtering coefficients comprise a respective filtering coefficient for the each of the first set of pixels;
determining a pixel difference value between the current input pixel and each neighboring pixel of the first set of pixels;
determining an attenuation factor for each filtering coefficient of the spatial noise filter using the pixel difference values;
applying a respective attenuation factor to each filtering coefficient to determine a set of attenuated filtering coefficients;
applying the attenuated filtering coefficients to the first set of pixels to obtain a set of filtered pixel values; and
providing a spatially filtered output value corresponding to the current input pixel by normalizing a sum of the filtered pixel values using a sum of the set of attenuated filtering coefficients.

2. The method of claim 1, wherein applying spatial noise filtering comprises operating the spatial noise filter in one of a bilateral filtering mode or a nonlocal means filtering mode.

3. The method of claim 2, wherein if the spatial noise filter is operating in the bilateral filtering mode, determining a pixel difference value between the current input pixel and each neighboring pixel of the first set of pixels comprises:
for each neighboring pixel, determining the absolute value of the difference between the pixel value of the current pixel and a pixel value of the neighboring pixel.

4. The method of claim 2, wherein if the spatial noise filter is operating in the non-local means filtering mode, determining a pixel difference value between the current input pixel and each neighboring pixel of the first set of pixels comprises:
identifying a first subset of the neighboring pixels centered about the current input pixel; and
for each neighboring pixel, identifying a second subset of neighboring pixels centered about the neighboring pixel, determining a sum of the absolute value of the differences between the pixels of the first subset and the second subset, and normalizing the sum of the absolute value of the differences based on a number of pixels equal to the number of pixels of the first subset and the current input pixel.

5. The method of claim 1, wherein determining an attenuation factor for each filtering coefficient of the spatial noise filter using the pixel difference values comprises:
determining an inverse noise standard deviation value based upon the pixel value of the current input pixel;

determining a radial distance of the current input pixel relative to a center of the image frame;

using the radial distance to select a radial gain;

applying the radial gain to the inverse noise standard deviation value to obtain a gained inverse noise standard deviation value; and for each neighboring pixel, determining a respective attenuation factor based on the gained inverse noise standard deviation value and the pixel difference value between the current input pixel and the neighboring pixel, and associating the attenuation factor with a filter tap of the spatial noise filter that corresponds to the neighboring pixel.

6. The method of claim 1, wherein determining an attenuation factor for each filtering coefficient of the spatial noise filter using the pixel difference values comprises:

receiving a brightness value parameter corresponding the current input pixel;

receiving a pixel difference value corresponding to the difference between the current input pixel and a neighboring pixel located at a current filter tap having a filtering coefficient;

evaluating the brightness value parameter to select a brightness interval in which the current input pixel belongs, wherein the selected brightness interval includes a lower and upper brightness level;

determining a first lower pixel difference level and a first upper pixel difference level based on the lower brightness level;

determining a second lower pixel difference level and a second upper pixel difference level based on the upper brightness level;

determining a first attenuation factor from an attenuation factor look-up table based upon the lower brightness level, the first lower pixel difference level, and the first upper pixel difference level;

determining a second attenuation factor from the attenuation factor look-up table based upon the upper brightness level, the second lower pixel difference level, and the second upper pixel difference level; and interpolating the first and second attenuation factors to obtain the attenuation factor for the current filter tap.

7. The method of claim 6, wherein the brightness value parameter comprises an average brightness of same-colored pixels in a 3×3 block centered at the current input pixel.

8. The method of claim 6, wherein the attenuation factor look-up table provides attenuation factors having a range of between 0.0 to 1.0.

9. The method of claim 6, wherein the attenuation factor look-up table provides factors having a range of between 0 and a value greater than 1.0, and wherein if a factor of greater than 1.0 is selected, image sharpening is implemented at the current filter tap.

10. The method of claim 1, wherein the mutli-color raw pixel data comprises Bayer raw pixel data having a red component, a first green component, a second green component, and a blue component.

11. The method of claim 1, wherein the first set of pixels comprises an n×n block of same-colored pixels, wherein $n \geq 3$.

12. An image signal processing system comprising a spatial noise filter for spatially filtering multi-color raw image data acquired using an image sensor, wherein the spatial noise filter is configured to:

receive a current pixel from a current frame of raw image data, the current pixel being of a first color and having a first value and a spatial location within the current frame;

identify a group of neighboring pixels of the first color that are centered about the current pixel, wherein the identified group of neighboring pixels and the current pixel form an n×n block of pixels of the first color, wherein each pixel of the n×n block is associated with a respective filter tap of the spatial noise filter;

determine an absolute difference value between the current pixel and each neighboring pixel of the n×n block;

determine an inverse noise standard deviation parameter for the current pixel based on a brightness level corresponding to the first value and a radial gain based on the distance between the spatial location of the current pixel and a center point of the current frame;

for each neighboring pixel of the n×n block, determine an attenuation factor based on the inverse noise standard deviation parameter for the current pixel and the absolute difference value between the current pixel and the neighboring pixel, apply the attenuation factor to a filter coefficient at the filter tap associated with the neighboring pixel to obtain an attenuated filter coefficient at the filter tap;

apply the attenuated filter coefficients to the pixels within the n×n block to obtain a filtered pixel value for each pixel of the n×n block;

obtain a sum of the attenuated filter coefficients at each filter tap and a sum of the filtered pixel values; and providing a spatially filtered output value by dividing the sum of the filtered pixel values by the sum of the attenuated filter coefficients.

13. The image signal processing system of claim 12, wherein the spatial noise filter is configured to determine the inverse noise standard deviation parameter by:

providing a plurality of brightness intervals, each interval having an upper and lower brightness value;

evaluating the first value to select a brightness interval in which the current pixel belongs;

determine a first inverse noise standard deviation value corresponding to the upper brightness value of the selected brightness interval;

determine a second inverse noise standard deviation value corresponding to the lower brightness value of the selected brightness interval;

interpolating the first and second inverse noise standard deviation values to determine a third inverse noise standard deviation value; and applying the radial gain to the third inverse noise standard deviation value to obtain the inverse noise standard deviation parameter.

14. The image signal processing system of claim 12, wherein the n×n block comprises at least a 7×7 block of pixels of the first color.

15. The image signal processing system of claim 12, the image processing system comprises a temporal filter configured to apply temporal filtering to the multi-color raw image data.

16. The image signal processing system of claim 15, wherein the temporal filter is applied before the spatial noise filter.

17. The image signal processing system of claim 16, comprising defective pixel correction logic, wherein the defective pixel correction logic is configured to provide for at least one of static defect correction, dynamic defect correction, and speckle correction prior to spatial filtering by the spatial noise filter.

18. The image signal processing system of claim 17, wherein the temporal filter, the defective pixel correction logic, and the spatial noise filter form a front-end pixel processing unit of the image signal processing system.

19. The image signal processing system of claim 18, wherein the front-end pixel processing unit comprises a binning compensation filter located downstream from the spatial noise filter.

20. A spatial filtering method comprising:
receiving image frames comprising multi-colored raw pixels, wherein the image frames are acquired using an image sensor;
using a spatial noise filter to apply three-dimensional spatial noise filter an input pixel from a current image frame from a first time, wherein applying three-dimensional spatial noise filtering comprises:
determining a first spatially filtered value corresponding to the input pixel using pixels from the current image frame from the first time;
determining a second spatially filtered value corresponding to the input pixel using pixels from a previous image frame from the second time; and
determining a spatially filtered output value for the input pixel based upon an average of the first and second spatially filtered values;
wherein determining the first spatially filtered value comprises:
identifying in the current image frame a first group of same-colored neighboring pixels centered about the input pixel and forming a first n×n block of pixels, wherein each pixel of the first n×n block is associated with a respective filter tap of the spatial noise filter;
determining an absolute difference value between the current pixel and each neighboring pixel of the first n×n block:
using the absolute difference values between the current pixel and each neighboring pixel of the first n×n block, determining a first set of attenuation factors corresponding to filtering coefficients associated with the filter taps of the spatial noise filter;
applying the first set of attenuation factors to the filtering coefficient to determine a first set of attenuated filtering coefficients;
applying the first set of attenuated filtering coefficients to the pixels of the first n×n block to determine a first set of filtered pixel values; and
determining the first spatially filtered value by normalizing a sum of each of the first set of filtered pixel values by a sum of each of the first set of attenuated filtering coefficients; and
wherein determining the second spatially filtered value comprises:
identifying in the previous image frame a second group of same-colored neighboring pixels co-located with the first group of same-colored neighboring pixels identified from the current image frame, wherein the input pixel and the second group of same-colored neighboring pixels form a second n×n block of pixels, wherein each pixel of the second n×n block is associated with a respective one of the filter taps of the spatial noise filter;
determining an absolute difference value between the current pixel and each neighboring pixel of the second n×n block:
using the absolute difference values between the current pixel and each neighboring pixel of the second n×n block, determining a second set of attenuation factors corresponding to filtering coefficients associated with the filter taps of the spatial noise filter;
applying the second set of attenuation factors to the filtering coefficient to determine a second set of attenuated filtering coefficients;
applying the second set of attenuated filtering coefficients to the pixels of the second n×n block to determine a second set of filtered pixel values; and
determining the second spatially filtered value by normalizing a sum of each of the second set of filtered pixel values by a sum of each of the second set of attenuated filtering coefficients.

21. The method of claim 20, wherein determining the first set of attenuation factors comprises, for each neighboring pixel of the first n×n block of pixels:
using a brightness value of the input pixel to determine an inverse noise standard deviation parameter;
applying to the inverse noise standard deviation parameter, a radial gain determined based upon the radial distance of the input pixel from the center of the current frame; and
using the gained inverse noise standard deviation parameter and a delta value equal to the absolute difference value between the input pixel and the current neighboring pixel to derive an attenuation factor corresponding to the filter tap associated with the current neighboring pixel.

22. The method of claim 21, wherein the attenuation factor is derived using an exponential function, with the gained inverse noise standard deviation parameter and the delta value being exponential components of the exponential function.

23. The method of claim 21, wherein determining the radial gain comprises:
providing a plurality of radial distance intervals between the center of the current frame and a maximum radius value, each radial distance interval having an upper and lower radius;
evaluating the radial distance of the input pixel from the center of the current frame to select a radial distance interval in which the radial distance;
determine a first radial gain value corresponding to the upper radius of the selected radial distance interval;
determine a second radial gain value corresponding to the lower radius of the selected radial distance interval; and
interpolating the first and second radial gain values to determine the radial gain.

24. The method of claim 20, wherein determining a spatially filtered output value for the input pixel based upon an average of the first and second spatially filtered values comprises weighting the first spatially filtered value by a greater amount than the second spatially filtered value.

25. An electronic device comprising:
an image sensor configured to acquire raw image data comprising a plurality of raw pixels representative of an image scene;
an image signal processing sub-system; and
a memory device configured to store the raw image data;
a sensor interface configured to provide the raw pixels from the image sensor at least one of the memory or the image signal processing sub-system, wherein the image signal processing sub-system comprises a front-end processing unit comprising:
a spatial noise filter comprising a plurality of filter taps and configured to apply spatial filtering to a raw input pixel a current image frame by identifying an n×n block of pixels from the current image frame, the n×n block including a plurality of neighboring pixels being centered about the raw input pixel and being of the same color component as the raw input pixel, wherein each pixel of the n×n block corresponds to a respective one of the plurality of filter taps of the spatial noise filter, identifying a set of filtering coefficients for each filter tap of the spatial noise filter, determining a pixel difference value between the raw input pixel and each of the plurality of neighboring pixels in the n×n block, attenuating each of the filtering components by determining an attenuation factor for each filter tap, wherein the attenuation factor is based at least partially upon the pixel difference value between the raw input pixel and the neighboring pixel at the filter tap, applying a respective attenuation factor to each filtering coefficient of the spatial noise filter to determine a set of attenuated filtering coefficients, applying the attenuated filtering coefficients to the pixels of the n×n block to obtain a set of filtered pixel values, and outputting a spatially filtered value by normalizing a sum of the filtered pixel values based upon a sum of the set of attenuated filtering coefficients.

26. The electronic device of claim 25, wherein the image sensor comprises a Bayer color filter array, and wherein the raw pixels comprise Bayer pixels.

27. The electronic device of claim 25, wherein the image sensor comprises at least one of a digital camera integrated with the electronic device, an external digital camera coupled to the electronic device via the interface, or some combination thereof.

28. The electronic device of claim 25, wherein the sensor interface comprises a Standard Mobile Imaging Architecture (SMIA) interface, a serial interface, a parallel interface, or some combination thereof.

29. The electronic device of claim 25, comprising at least one of a desktop computer, a laptop computer, a tablet computer, a mobile cellular telephone, a portable media player, or any combination thereof.

\* \* \* \* \*